United States Patent Office 3,655,591
Patented Apr. 11, 1972

3,655,591
OPAQUE, NON-PIGMENTED MICROPOROUS FILM AND PROCESS AND COMPOSITION FOR PREPARING THE SAME
Jerome A. Seiner, Pittsburgh, Pa., assignor to PPG Industries, Inc., Pittsburgh, Pa.
Continuation-in-part of application Ser. No. 524,953, Feb. 1, 1966. This application Jan. 13, 1970, Ser. No. 2,534
Int. Cl. C08 1/26
U.S. Cl. 260—2.5 M
29 Claims

ABSTRACT OF THE DISCLOSURE

This invention relates to films which are opaque and microporous, but which do not contain pigments to enhance their whiteness. The continuous, opaque films are prepared by mixing a homogeneous solution of thermosetting polymeric material with a solvent mixture for said polymeric material comprising at least two miscible liquids, at least one of said liquids being a non-solvent for said polymeric material and having a lower volatility than that of the other liquids in said mixture. Upon curing of the resin material, the non-solvent which is precipitated in the resin matrix is evaporated to form a film containing discrete closed cells. The films are useful in producing heat and mar resistant paints and coatings without the addition of costly pigments.

---

Figure 1:
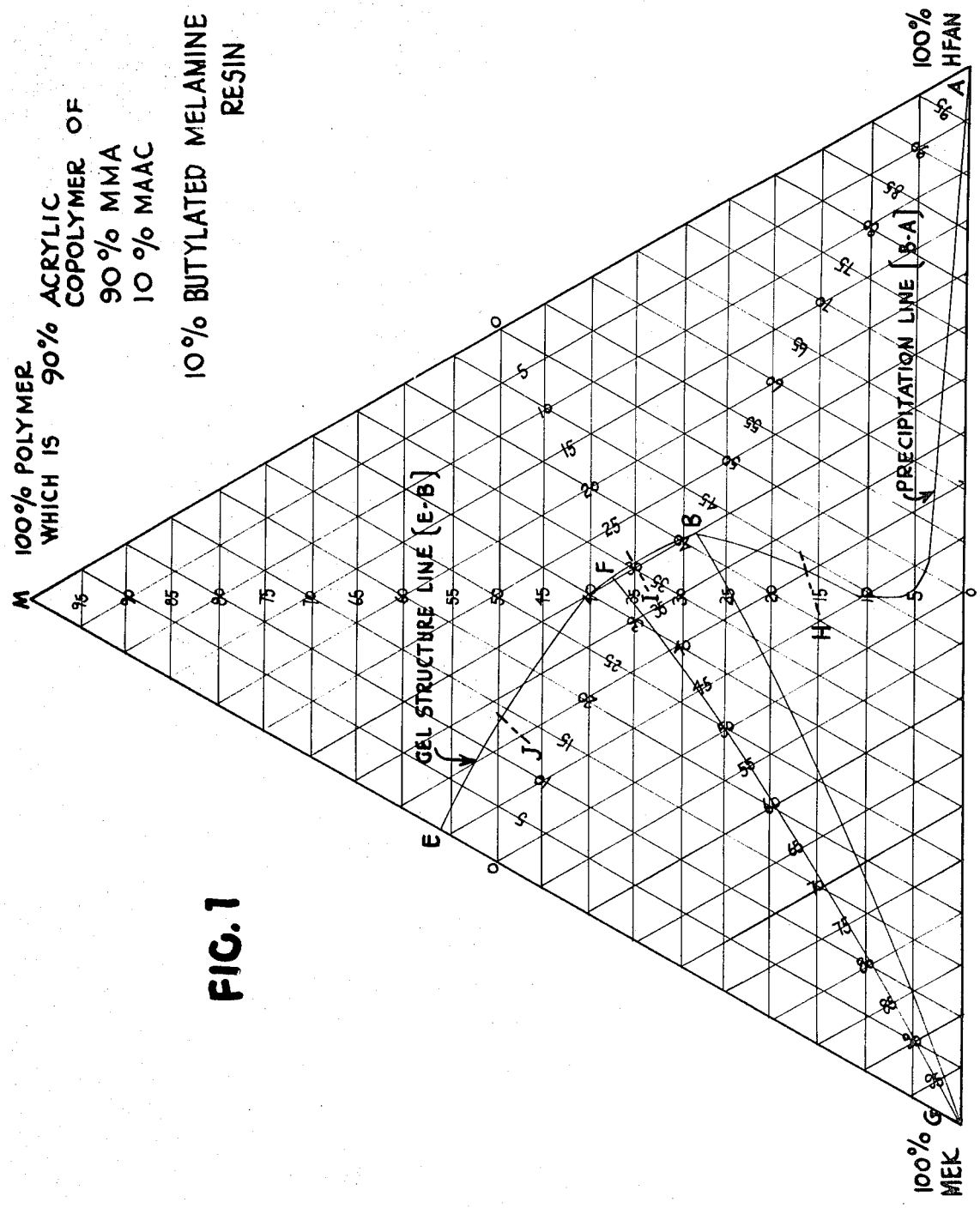

This application is a continuation-in-part of my copending application Ser. No. 524,953, filed Feb. 1, 1966, now abandoned.

BACKGROUND OF THE INVENTION

This invention relates to films which are opaque and microporous but which do not contain pigments conventionally used in the preparation of opaque films. More particularly, this invention relates to the preparation of such a film by the phenomenon of solvent precipitation. Another aspect of this invention relates to a composition which is useful in preparing such a film.

Opaque films are conventionally prepared by adding a pigment which acts as an opacifying agent to a solution of a film forming material which would otherwise be colorless or transparent when cast in a film. The necessity for adding an opacifying agent obviously increases the cost of the resultant film. Moreover, such films have no more porosity than the non-pigmented film.

Optical opacity, for example hiding in a paint film, is achieved either by absorption of the incident light or by scattering of the incident light, or a combination of these two. Thus, black is opaque because it absorbs the light incident on it and white is opaque because it backscatters the incident light. Light is either absorbed or scattered before it can reach the substrate. The ideal white pigment then is one which has zero absorption and maximum scattering.

Absorption depends primarily on the electronic structure of the molecule, as well as on the pigment particle size relative to the wavelength of light. Scattering depends on the relative refractive indexes of pigment and vehicle as well as on the particle size of the pigment relative to the wavelength of incident light.

One simple description of the relation of the scattering and absorption to the resulting reflectance is that of Kubelka and Munk. At complete hiding, the following equation applies:

$$\frac{(1-R_\infty)^2}{2R_\infty} = \frac{K}{S} \quad \text{(Equation 1)}$$

where R is reflectance of a film so thick that a further increase in thickness does not change the reflectance, K is the absorption coefficient and S is the Kubelka-Munk scattering coefficient. No account is taken of the surface reflectances, and the equation applies only to internal reflectance.

The fractions contributed by more than one pigment in a system are additive as shown by the following equation:

$$\frac{(1-R_\infty)^2}{2R_\infty} = \frac{C_1 K_1 + C_2 K_2 + C_3 K_3 + \ldots}{C_1 S_1 + C_2 S_2 + C_3 S_3 + \ldots} \quad \text{(Equation 2)}$$

where $C_1$, $C_2$ and $C_3$ refer to the concentrations of pigments 1, 2, 3 etc.

When hiding is incomplete, the following equation applies:

$$R = \frac{1 - Rg(a - b \text{ ctgh } bSX)}{a - Rg + b \text{ ctgh } bSX} \quad \text{(Equation 3)}$$

where R is the resulting internal reflectance, $Rg$ is the reflectance of the substrate, $a$ is equal to $(S+K)/S$, $b=(a^2-1)^{1/2}$, S is the scattering coefficient, X is the thickness of the film in mils, and ctgh refers to hyperbolic cotangent.

The Kubelka-Munk scattering coefficient may be computed from the following equation:

$$SX = \frac{1}{b} Ar \text{ ctgh } \frac{1-aRo}{bRo} \quad \text{(Equation 4)}$$

where Ar ctgh refers to the inverse hyperbolic cotangent, $Ro$ is the reflectance over a black substrate of 0% reflectance, $a$ may be found from the relation, $$a = \frac{1}{2}\left[R + \frac{Ro - R + Rg}{RoRg}\right]$$

and $b$ is determined as above. In this equation, R equals reflectance over a white substrate and $Rg$ is reflectance of the substrate which is coated; or $a$ may be found from the following equation:

$$a = \frac{1}{2}\left[\frac{1}{R_\infty} + R_\infty\right]$$

K may be found from the equation $K=S(a-1)$.

The Kubelka-Munk analysis is discussed in further detail by D. B. Judd in "Color in Business, Science and Industry," John Wiley and Sons, Inc, New York, 1952, pp. 314–338; and by D. B. Judd and G. Wyszecki in "Color in Business, Science, and Industry," 2nd Edition, John Wiley and Sons, New York, 1963, pp. 387–413, the disclosures of which are incorporated herein by reference.

Various processes have been described in the art for preparing opaque films which rely for opacity upon the presence of a large number of voids in the film. Such films may be prepared by depositing a film from an emulsion, i.e., either an oil-in-water or a water-in-oil emulsion. When a water-in-oil emulsion is used—i.e., one in which minute droplets of water are dispersed in a continuous phase of a film forming material—the emulsion is deposited as a coating and the organic solvent which comprised the continuous phase of the emulsion is evaporated therefrom. This causes gelation of the film forming material and entrapment of the dispersed water droplets. The water is then evaporated leaving microscopic voids throughout the film structure.

When an oil-in-water emulsion is used, the mechanism for forming the film is similar to that described above. A film forming material is dissolved in water. Thereafter, an organic liquid which is a non-solvent for the film former and which is not miscible with water is emulsified in the aqueous phase. The emulsion is cast as a film and the water is evaporated causing the film forming material to gel and entrap minute droplets of the organic liquid. This liquid is then evaporated to cause minute voids in the film structure.

Another technique for obtaining porous, opaque, non-pigmented films is by preparing an aqueous dispersion of a film forming polymer containing a water soluble organic solvent in an amount which is insufficient to dissolve the polymer. This aqueous dispersion is then cast as a film and water is evaporated causing entrapment of minute droplets of the organic solvent in the polymer. The film is then washed to dissolve the entrapped minute droplets of solvent and the film is dried.

However, the use of emulsions presents certain problems, by virtue of the very nature of an emulsion. For example, in handling an emulsion, care must be taken in order to insure its stability—i.e., so that it will not break before it is used to deposit a film. This frequently requires the use of emulsifying agents. However, emulsifying agents which are then present in the film detract from the physical properties of the film such as its water repellency, scrub resistance, etc. Furthermore, only film forming materials which are capable of being readily emulsified may be employed in such a system. Moreover, when films are formed from emulsions, the size of the voids present in the film are dependent upon the size of the droplets in the emulsion which are entrapped in the film. This places a definite limitation upon the smallness of the voids which are obtained in the film.

Still another technique for obtaining a porous, opaque, non-pigmented film is set forth in U.S. Pat. No. 3,031,328. Basically, this process contemplates preparing a solution of a thermoplastic polymer material in a mixture of a volatile organic solvent and a volatile non-solvent liquid which has an evaporation rate substantially less than that of the solvent. The clear homogeneous solution is then coated on a suitable backing material and dried by evaporation to produce an opaque blushed film which is adapted to be rendered locally transparent by heat or pressure. These films are useful as recording films.

However, the use of the thermoplastics which will become transparent upon the application of heat or pressure would not be suitable for most industrial and household uses as coatings. On the other hand, the use of either a durable plastic or a thermosetting resin would not be useful in the art of recording materials, since these films would not become transparent upon the application of moderate heat or pressure.

The resins employed in preparing these prior art recording films may be any one of a wide variety of thermoplastic film forming materials.

Examples of useful resins which may be used in the foregoing prior art process include cellulose derivatives (e.g., ethyl cellulose, nitrocellulose, cellulose acetate, cellulose propionate and cellulose acetate butyrate); acrylic resins (e.g., homopolymers and copolymers with each other or with other monomers of methyl acrylate, methyl methacrylate, ethyl acrylate, ethyl methacrylate, butyl acrylate, butyl methacrylate, acrylic acid and methacrylic acid); polyolefins (e.g., polyethylene and polypropylene); nylon; polycarbonates; polystyrene, copolymers of styrene and other vinyl monomers such as acrylonitrile; vinyl polymers such as homopolymers and copolymers of vinyl acetate, vinyl alcohol, vinyl chloride and vinyl butyral; homopolymers and copolymers of dienes such as polybutadiene, butadiene-styrene copolymers and butadiene-acrylonitrile copolymers.

Graft copolymers or block copolymers may also be used as the thermoplastic resin. Such copolymers possess segmental periodicity—i.e., they contain continuous sequences of one monomer that are not governed by statistical distribution. They may be formed by methods known in the art such as by polymerizing a vinylidene monomer in the presence of an appropriate preformed polymer and catalyst. Specific details for the preparation of graft copolymers are described, for example, in U.S. Pat. No. 3,232,903. The preformed polymer may be, for example, a polymeric ester of acrylic acid or methacrylic acid such as a copolymer of an ester of methacrylic acid or acrylic acid formed with an alcohol having 4 to 18 carbon atoms or of mixtures of such esters with esters of methacrylic acid or acrylic acid formed with alcohols having 1 to 5 carbon atoms. Mixtures of methacrylate and acrylate esters with from 1% to 50% by weight of monoethylenically unsaturated monomers such as maleic anhydride, acrylic acid, methacrylic acid, vinyl pyrrolidone, N,N-dimethylaminoethyl acrylate or methacrylate, N,N-dimethylaminoethylacrylamide or methacrylamide, dimethylaminoethyl vinyl ether, dimethylaminoethyl vinyl sulfide, vinyl chloride, vinylidene chloride, vinyl acetate, vinyl propionate, vinyl laurate, vinyl stearate, vinyl oleate, ethylene, isobutylene, acrylamide, methacrylamide, acrylonitrile, methacrylonitrile, vinyl ethyl ether and vinyl isobutyl ether may also be used in the preparation of the preformed polymer.

Vinylidene monomers which may be polymerized in the presence of the preformed polymer include vinyl esters of fatty acids having from 1 to 18 carbon atoms such as vinyl acetate, vinyl propionate, vinyl butyrate, vinyl laurate, vinyl oleate and vinyl stearate; esters of acrylic acid or methacrylic acid with alcohols having from 1 to 18 carbon atoms such as methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, cyclohexyl acrylate, cyclohexyl methacrylate, etc.; acrylonitrile, methacrylonitrile, acrylamide, methacrylamide, styrene, α-methylstyrene, vinyl toluene, acrylic acid, acrylic acid anhydride, methacrylic acid, methacrylic acid anhydride, maleic anhydride, fumaric acid, crotonic acid, allyl acetate, glycidyl methacrylate, t-butylaminoethyl methacrylate; hydroxyalkyl acrylates or methacrylates such as β-hydroxyethyl methacrylate, β-hydroxyethyl vinyl ether, β-hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, and tetrafluoroethylene.

Mixtures of two or more thermoplastic resins may also be used in the foregoing prior art process. Thus, for example, when a graft copolymer is prepared as described above by polymerizing a vinylidene monomer in the presence of an appropriate prepolymer, there is generally obtained a mixture of a graft copolymer comprising grafts of the vinylidene monomer on the prepolymer, and a homopolymer of the vinylidene monomer (or a copolymer if two or more different vinylidene monomers are employed). This mixture of polymers may be used as such or it may be separated into its component parts and either the graft copolymer or homopolymer used alone.

DETAILED DESCRIPTION OF THE INVENTION

It is an object of this invention to provide microporous, opaque, non-pigmented thermosetting resin films.

It is another object of this invention to provide a process for preparing thermosetting resin films which do not rely upon the use of emulsions or solvent extraction.

It is a further object of this invention to provide a coating composition for use in preparing such films.

These and other objects are achieved by the practice of this invention which, briefly, comprises producing a continuous, opaque film containing closed cells by a process which comprises (a) applying to a substrate or forming into a film by a suitable manner a composition comprising a film forming gelable polymer, and a solvent mixture for said film forming material comprising at least two miscible liquids, at least one of said liquids being a non-solvent for said polymer and having a lower volatility than that of the other liquids in said mixture, the amount of said lower volatility non-solvent liquid present in said mixture preferably being at least enough to produce, upon the removal of said solvent mixture from said composition, a film having a Kubelka-Munk scattering coefficient greater than 0.5 reciprocal mil at 4400 angstroms and greater than 0.1 reciprocal mil at 5600 angstroms, and less than that which, upon the removal of said solvent mixture from said composition, produces a discontinuous film, and (b) removing the solvent mixture from the composition applied to said substrate.

The present invention contemplates the use of film forming, gelable polymers which include synthetic and natural thermosetting resins and mixtures thereof with other resinous materials such as thermoplastic resins and other thermosetting resins. The only limitations on the film forming polymers are that they must be soluble in (i.e., miscible with) the particular solvent mixture used and they must be capable of gelling (i.e., being transformed) from the liquid phase to the solid phase upon evaporation of a portion of the solvent system. In other words, the film forming polymers must be capable of establishing a sufficient gel structure so the voids formed by the non-solvent can withstand cross linking conditions. It will be apparent as described hereinafter that in some systems, such as for example when employing some of the more inactive aminoplast resins, an acid catalyst is necessary to cause the film to form the proper gel structure prior to baking or other curing means. The resulting films of this invention become very tough upon curing and provide excellent opaque coatings in the absence of an opacifying agent for industrial and household use.

The thermosetting resins which may be used in the practice of this invention are well known in the art. Such resins are curable to a cross linked thermoset condition by the use of either oxidation, radiation, heat and/or a curing agent.

One preferred group of thermosetting resins which may be used in the practice of this invention are admixtures of interpolymers of hydroxyl esters of ethylenically unsaturated acids with at least one other polymerizable ethylenically unsaturated monomer. Interpolymers of hydroxyl esters of unsaturated acids with at least one other polymerizable ethylenically unsaturated monomer are prepared by interpolymerizing a mixture of monomers comprising from about 2 to about 50 percent by weight of a hydroxyalkyl ester of an ethylenically unsaturated carboxylic acid and at least one other ethylenically unsaturated monomer copolymerizable therewith. In many cases, more than one hydroxyalkyl ester is included in the interpolymer, and generally several monomers in addition to the hydroxyalkyl ester or esters are employed. These interpolymers are produced in a manner well known in the art, using conventional procedures utilizing catalysts well known in the art. Free radical producing catalysts are commonly used but catalyst systems which function through other mechanisms can also be employed. The conditions of time, temperature and the like at which these interpolymerizations are carried out are also conventional and depend in large part upon the particular catalyst employed.

Preferred monomer systems used to produce these interpolymers are those containing hydroxyalkyl esters in which the alkyl group has up to about 12 carbon atoms. Especially preferred esters are acrylic acid and methacrylic acid esters of glycol and 1,2-propylene glycol, i.e., hydroxyethyl acrylate and methacrylate, and hydroxypropyl acrylate and methacrylate. Combinations of these esters are also widely used. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

In addition to esters of unsaturated monocarboxylic acids, there may be employed the mono- or diesters of unsaturated dicarboxylic acids, such as maleic acid, fumaric acid and itaconic acid, in which at least one of the esterifying groups is hydroxyalkyl. Such esters include bis(hydroxyethyl) maleate, bis(hydroxypropyl) fumarate, and similar bis(hydroxyalkyl) esters, as well as mixed alkyl hydroxyalkyl esters, such as butyl hydroxyethyl maleate and benzyl hydroxypropyl maleate. Monoesters such as mono(hydroxyethyl) and mono(hydroxypropyl) esters of maleic acid and similar acids can also be used.

The monomer or monomers with which the hydroxyalkyl ester is interpolymerized can be any ethylenic compound copolymerizable with the ester, the polymerization taking place through the ethylenically unsaturated linkages. These include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. Examples of such monomers include styrene, 1,3-butadiene, 2-chlorobutene, alpha-methylstyrene, alpha-chlorostyrene, 2-chloro-1,3-butadiene, 1,1-dichloroethylene, vinyl butyrate, vinyl acetate, allyl chloride, dimethyl maleate, divinylbenzene, diallyl itaconate, triallyl cyanurate, and the like.

The most useful interpolymers of this type are produced from the interpolymerization of one or more hydroxyalkyl esters with one or more alkyl esters of ethylenically unsaturated carboxylic acids or a vinyl aromatic hydrocarbon, or both. Among these preferred comonomers are the ethyl, methyl, propyl, butyl, hexyl, ethyl hexyl, and lauryl acrylates and methacrylates, as well as similar esters having up to about 20 carbon atoms in the alkyl group. Among the vinyl aromatic hydrocarbons generally utilized are styrene and alpha-alkylstyrene or vinyltoluene. The preferred monomer systems may include an ethylenically unsaturated nitrile, such as acrylonitrile or methacrylonitrile, and in many instances an ethylenically unsaturated carboxylic acid is present, of which the preferred are acrylic acid and methacrylic acid. The specific comonomers most often employed are methyl methacrylate, ethyl acrylate, styrene, vinyltoluene, acrylonitrile, methacrylonitrile, methacrylic acid, acrylic acid, 2-ethylhexyl acrylate, butyl acrylate, butyl methacrylate, and lauryl methacrylate.

Examples of catalysts ordinarily used in the interpolymerization include peroxygen compounds such as benzoyl peroxide, cumene hydroperoxide, hydrogen peroxide, and t-butylperoxy isopropyl carbonate, and azo compounds such as alpha, alpha-azobis(isobutyronitrile) and p-methoxyphenyl diazothio(2-naphthyl) ether.

Cross linking agents for interpolymers of hydroxyalkyl esters are materials which contain functional groups reactive with the hydroxyl groups of the interpolymer. Examples of such coreactive materials include polyisocyanates, such as toluene diisocyanate and isocyanato-containing polymeric products; aminoplast resins; such as hexa(methoxymethyl)melamine and others described hereinafter; epoxy resins; such as polyglycidyl ethers of 2,2-bis(4-hydroxyphenyl)propane, commonly known as Bisphenol A; and others, e.g. silicone resins.

Another preferred group of thermosettable resins which may be used in the practice of this invention are admixtures of alkyd resins. Alkyd resins are obtained by the condensation of a polyhydric alcohol and a polycarboxylic acid.

In forming the alkyd resin which can be used in admixture with an aminoplast resin, various polyols can be used. These include glycerol, pentaerythritol, dipentaerythritol, mannitol, sorbitol, trimethylolethane, trimethylolpropane, 1,3,6-hexanetriol, and others. These are usually employed in amounts approximating, or somewhat exceeding equivalency with respect to the acid component.

Usually the acid component comprises a mixture of dibasic and monobasic acids. The dibasic acids are represented by such dicarboxylic acids as phthalic acid, isophthalic acid, terephthalic acid, tetrachlorophthalic acid, tetrabromophthalic acid, carbic acid (i.e., the reaction product of maleic acid and cyclopentadiene), chlorendic acid, fumaric acid, maleic acid, itaconic acid, adipic acid and sebacic acid, or combinations of these acids. The term "acid" also includes the anhydrides thereof where they exist.

It is preferable to include a substantial amount of a monocarboxylic acid in the alkyd resin. Appropriate monocarboxylic acids comprise saturated aliphatic acids containing about 8 to about 18 carbon atoms, such as lauric acid, palmitic acid, steric acid, hydroxysteric acid; unsaturated acids such as oleic acid and ricinoleic acid, pelargonic acid, decanoic acid, myristic acid, cyclohexylcarboxylic acid, 2-ethylhexoic acid, acrylic acid, methacrylic acid, abietic acid; aromatic acids such as benzoic acid, p-tertiarylbutylbenzoic acid, toluic acid, and others. Usually the two types of acids (dicarboxylic acid and monocarboxylic acid) are employed in about equimolar amounts, but these ratios can be varied if desired. Monocarboxylic acids low in or free of functional unsaturation, such as ethylenic groups, are presently preferred. The use of such acids results in the production of non-oxidizing oil modified alkyds. Pure acids or mixtures of two or more thereof with each other may be employed. Such mixtures of monobasic acids as are obtained from natural sources, such as glycerides represented by coconut oil, soya oil, corn oil, cotton seed oil, are examples of useful mixtures of useful acids. Acids distilled from tall oil may be employed.

Mixtures of aliphatic monocarboxylic acids, such as coconut oil acids, and about 5 to 30 percent by weight of an aromatic monocarboxylic acid, such as benzoic acid, may be used as the monocarboxylic acid component of the resin.

The fatty acids need not necessarily be employed as free acids, but may be employed as partial esters of a polyol such as glycerol, pentaerythritol, or other polyhydric alcohol. Such partial esters will average about 2 available hydroxyl groups per molecule and they are reacted by esterification with a dicarboxylic acid such as herein disclosed to provide an alkyd resin.

The sums of the acids usually are employed in slightly less (e.g. 1 to 10 molar percent) than molar equivalency with respect to the polyhydric alcohol. The two types of acids (dicarboxylic and monocarboxylic) are also most often employed in approximately equal moles. However, variations in this respect are also contemplated. The range may be, for example, about 30 to 70 molar percent of one of the said acids, the remainder being the other.

Further details for the preparation of alkyd resins are described in the book entitled "Organic Coating Technology," volume I, by Henry F. Payne, published by John Wiley & Sons (1954), chapter 7.

Cross linking agents for the alkyd resins include those materials which contain functional groups reactive with the hydroxyl groups of the alkyd, examples of which have been previously described in relation to cross linking agents for interpolymers of hydroxy alkyl esters. The preferred cross linking agents are aminoplast resins which will be more fully described hereinafter. Various proportions of alkyd resin and aminoplast resin cross linking agent may be employed as the thermosetting resin component of this invention. For example, the aminoplast resin may constitute from about 5 to about 50 percent by weight of the mixture of the two resins, although this ratio is not critical. The blend of the alkyd resin and the aminoplast resin may also include various added vehicular agents such as plasticizers represented by epoxidized oils, so-called chemical plasticizers such as triphenyl phosphate, tricresyl phosphate, dicyclohexyl phthalate, butylbenzyl phthalate, and others.

Aminoplast resins which are the preferred cross linking agents for interpolymers of hydroxyl esters of unsaturated acids and for alkyd resins are derived from the reaction of a compound containing a plurality of —NH$_2$ groups (e.g., urea, melamine, acetoguanamine or benzoguanamine) with an aldehyde or a substance acting as an aldehyde (e.g., formaldehyde, benzaldehyde, or paraformaldehyde). In preparing aminoplasts, the aldehyde or its equivalent is usually dissolved in an alkanol, such as butyl alcohol, and at least a part of the N-methylol groups on the aminoplast are converted into

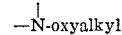

groups as represented by the formula:

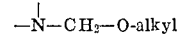

These groups are distributed as side chains in the resin molecules. Butanol may be replaced by other monohydric aliphatic alcohols containing from about 1 to about 8 carbon atoms and being represented by methyl alcohol, ethyl alcohol, propyl alcohol, isopropyl alcohol, butyl alcohol, isobutyl alcohol, pentyl alcohol, hexyl alcohol and octyl alcohol. All of these are primary or secondary alcohols. Such resins contain

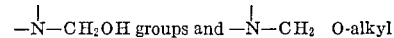

groups, wherein the moiety designated as "alkyl" ordinarily contains from 1 to 8 carbon atoms. It is preferred that the alkyl groups be butyl—i.e., that the curing agent be a butylated aminoplast.

When employing the alkoxylated aminoplast resin as the cross linking agent as described hereinabove, substantial gel structure should be established in the film prior to subjecting the film to the final curing temperature, i.e., temperatures above about 150° F., if it is desired to obtain highly cross linked, mar resistant, opaque films. If substantial gel structure is not established in the film prior to the subjection of the uncured resin to the final curing temperatures, the film will flow, thereby collapsing the light scattering voids produced by the non-solvent. The resulting film would thereby be a highly cross-linked clear, mar resistant film.

One preferred method for obtaining substantial gel structure in the high temperature curing systems of this invention is to add a small amount of a mineral acid or other known curing agent suitable for the cross linking materials in the system. Among the preferred mineral acids which may be added to the thermosetting system to cause substantial gel structure at lower temperatures are phosphoric acid, and its mono- and dialkyl esters, sulfuric acid and its monoesters, p-toluene sulfonic acid and its amine salts, e.g. morpholine. Phosphoric acid and its esters are the most preferred curing agents since they are soluble in most of the polymer systems contemplated for the purpose of this invention.

One method for determining whether a film has established substantial get structure as indicated hereinabove, is to determine if the film has reached a tack-free state. In the paint and coatings industry, a common method for determining if a film is tack-free is by the use of the "cotton test" or "Cotton Fiber Method." When a film is tack-free, cotton threads no longer adhere to the film. Specifically, this tack-free state of the film can be determined by A.S.T.M. Method D 1640–65–T–5.2.1 whereby cotton fibers are dropped onto the film at regular drying intervals on a specified portion of the film. The film is considered tack-free when the cotton fibers can be removed by blowing lightly over the surface of the film. Another method for determining whether the film is tack-free is by employing the "Powder Method" described as A.S.T.M. Method D 1640–65–T–5.2.2. This method is conducted by depositing finely divided calcium carbonate (pigment grade) on the film at definite intervals during the drying period and when the film has dried to a tack-free state, the pigment can be removed by blowing with a gentle stream of air and wiping with a soft rag or camel hair brush. The film is considered tack-free when the pigment can be removed completely.

When the film reaches a tack-free state it is ready to undergo final curing conditions by baking at temperatures usually above 150° F. and the film will not flow thereby collapsing the voids formed by the non-solvent.

In a particularly preferred embodiment of the invention, cellulose ester resins are used in conjunction with the aminoplast resins. The addition of the cellulose ester resins further aids in establishing the gel structure at lower temperatures so that the voids in the film will be able to withstand cross linking conditions during the final curing stage. Among the preferred cellulose ester resins used for the foregoing purpose are cellulose acetate butyrate, cellulose acetate propionate and cellulose acetate. It will be understood by those skilled in the art that many other derivatives of cellulose may also be used.

Further information as to the preparation and characteristics of aminoplast resins are contained in the aforementioned book entitled "Organic Coating Technology," chapter 8, pages 326 to 350.

Thermosetting resin compositions comprising mixtures of an interpolymer of a hydroxyalkyl ester and an aminoplast resin are further described in U.S. Pat. Nos. 2,681,-897, 3,375,227 and 3,382,294; and further details for the preparation of aminoplast resins and alkyd resins which may be employed are described in U.S. Pat. No. 3,113,-117, the disclosures of which are incorporated herein by reference.

Another group of thermosetting resins which may be used are carboxylic acid amide interpolymers of the type disclosed in U.S. Pat. Nos. 3,037,963 and 3,118,853 the disclosures which are incorporated herein by reference. These interpolymers are prepared by forming an interpolymer of from about 2 to about 50% based upon the total weight of the copolymer of an unsaturated carboxylic acid amide, such as acrylamide or methacrylamide, with at least one other polymerizable ethylenically unsaturated monomer, and then reacting the interpolymer with an aldehyde, such as formaldehyde, in the presence of an alcohol, such as butanol. The exact mechanism whereby the amide interpolymers are obtained is not definitely known, but is believed to begin by the formation initially of a relatively short chain soluble interpolymer having an approximate structure as follows, acrylamide being utilized for illustrative purposes:

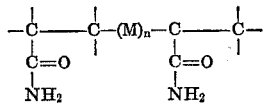

wherein M represents a unit of a monomer polymerizable with acrylamide, and $n$ represents a whole number greater than 1. For example, if styrene were utilized as the second monomer, M would represent the unit:

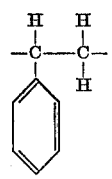

The short chain interpolymer then reacts with an aldehyde, as represented by formaldehyde, to give the structure

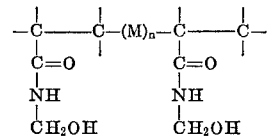

wherein M and $n$ have the significance set forth hereinabove.

In the event the aldehyde is utilized in the form of a solution in butanol or other alkanol, etherification will take place so that at least some of the methylol groups in the above structure will be converted to groups of the structure $$-ROR_1$$

wherein R is a saturated lower aliphatic hydrocarbon radical having its free valences on a single carbon atom, and $R_1$ is a member of the class consisting of hydrogen and the radical derived by removing the hydroxyl group from the alkanol.

It is desirable that at least about 50 percent of the methylol groups be etherified since compositions having less than about 50 percent of the methylol groups etherified will tend to be unstable and subject to gelation. Butanol is the preferred alcohol for use in the etherification process, although any alcohol such as methanol, ethanol, propanol, pentanol, octanol, decanol, and other alkanols containing up to about 20 carbon atoms may also be employed as may aromatic alcohols such as benzyl alcohol or cyclic alcohols.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and imide derivatives such as N-carbamylamaleimide may also be utilized.

Any polymerizable monomeric compound containing at least one

group may be polymerized with the unsaturated carboxylic acid amide. These include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. Examples of such monomers include styrene, isobutylene, 1,3-butadiene, 2-chlorobutene, vinyl chloride, vinylidene chloride, alpha-methylstyrene, alpha-chlorostyrene, 2-chloro-1,3-butadiene 1,1-dichloroethylene, vinyl butyrate, vinyl acetate, allyl chloride, methyl methacrylate, methyl acrylate, ethyl methacrylate, ethyl acrylate, butyl methacrylate, butyl acrylate, lauryl methacrylate, acrylonitrile, methacrylonitrile, acrylic acid methacrylic acid and vinyl silicone containing compounds.

The preparation of the amide interpolymer is described in detail in U.S. Pats. 2,870,116 and 2,870,117, the disclosures of which are incorporated herein by reference.

The amide interpolymer resin prepared according to the disclosure in the above-identified patents is reacted with an aldehyde, preferably in the presence of an alcohol. Formaldehyde, in solution in water (Formalin) or in an alkanol such as butanol, or a formaldehyde-yielding substance such as paraformaldehyde, trioxymethylene, or hexamethylenetetraamine is greatly preferred. However, other aldehydes including acetaldehyde, butyraldehyde, furfural, and the like, preferably containing only atoms of carbon, hydrogen and oxygen can be used. Dialdehydes such as glyoxal are preferably not employed, since they tend to cause the amide interpolymer resin to gel.

The interpolymer will contain in the polymer chain recurrent groups of the structure

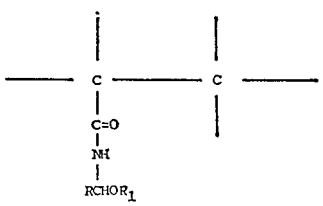

wherein R is hydrogen or a lower aliphatic hydrocarbon radical, and $R_1$, is hydrogen or the radical derived by removing the hydroxyl group from an alcohol. Thus, when the reaction is carried out in the presence of an alcohol, the alcohol reacts so that at least some, and preferably more than about 50 percent of the radicals $R_1$ will represent the radical derived from the alcohol. When the aldehyde is utilized alone, that is, not in an alcohol solution, the radical $R_1$, of course, will represent hydrogen. The free valences in the above structure may be satisfied with either hydrogen or hydrocarbon depending upon the amide which is utilized in the interpolymerization reaction. These resins upon subsequent baking produce highly cross linked structures, such cross linking sites including functional groups in other polymers present in the system where applicable.

Aldehyde-modified and etherified amide interpolymers can also be produced by first reacting the unsaturated amide with an aldehyde and, if desired, an alcohol, to form an N-alkylol or an N-alkoxyalkyl-substituted amide. The N-substituted amide then is interpolymerized with the other monomer or monomers as described above, thereby producing interpolymers having the aforesaid recurrent groups without the need for further reaction. Such a method utilizing N-alkoxyalkyl substituted amides is described in U.S. Pat. No. 3,079,434.

Advantageous properties are often obtainable by employing mixtures of the above amide interpolymer resins with other resinous materials, such as many of those mentioned herein. For example, cellulose acetate butyrate, cellulose acetate, cellulose, nitrocellulose, polyethylene, alkyd resins, epoxy resins, aminoplast resins, and others can be utilized for this purpose.

Another group of thermosetting resins which may be used in the practice of this invention are the epoxy resins. These epoxy resins are generally prepared by the combination of a polyhydric compound with epichlorohydrin in combination with a nucleophilic curing agent. The exact mechanism of forming the epoxy resin is not fully understood, but it is believed to begin by the opening of the epoxide through ether coupling with the polyhydric compound, with an attendant formation of a secondary alcohol group within a glycerol chlorohydrin ether as shown by the equation:

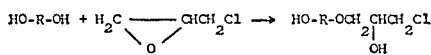

The alcohol group may react immediately in the presence of a base to give elimination of HCl and the formation of a terminal epoxy group as shown by the equation:

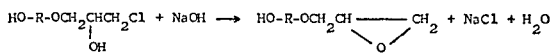

The resulting glycidyl ether further reacts with the dihydric compound, which in turn reacts with more epichlorohydrin and alkali to build up a substantially linear polymer. The epoxy polymerizations normally are carried out with a molecular excess of epichlorohydrin, so that the resulting low polymer has a terminal epoxy group as shown in the formula below:

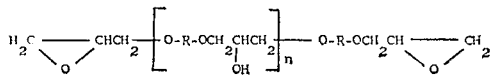

The proportion of excess epichlorohydrin can be chosen to regulate the polymer molecular weight. Most of the resins employed in the practice of this invention have from zero to about 20 recurring units designated above as $n$.

Suitable polyhydric compounds which may be used as reactants to prepare the epoxy resins are ethylene glycol, diethylene glycol, glycerol, 1,3,5-trihydroxybenzene, resorcinol, 1,5-dihydroxynaphthalene, 2,2,5,5 - tetrakis(4 - hydroxyphenol) hexane, 2,2-bis(4-hydroxyphenyl)propane, commonly known as bisphenol A and polyethers of polyalkylene oxide polyols with functionally substituted phenols (e.g., the epoxide disclosed in U.S. Pats. Nos. 3,145,-191 and 3,393,229). 2,2-bis(4-hydroxyphenyl)propane, commonly known as bisphenol A, is the preferred polyol employed in the practice of this invention due to its availability and highly desirable properties.

Epichlorohydrin may also be condensed with other types of compounds to produce excellent epoxy resins which may be used in the practice of this invention. Among these other compounds are mono- or polysulfonamides and hydrazines. For example 2,4-toluenedisulfonamide and epichlorodrin yields an intermediate which upon condensing with 5% piperidine forms a polymer softening above 100° C. A similar resin can be prepared from epichlorohydrin and N,N-dimethyl-2,4-toluenesulfonamide with piperidine.

Another group of useful epoxy containing polymers which may be employed in the practice of the invention are copolymers of acrylates, such as 2-ethylhexyl acrylate, and/or methacrylates, such as methyl methacrylate, with up to 50% of a comonomer such as dibutyl maleate or fumarate, butyl glycidyl maleate or fumarate and glycidyl methacrylate. Solvents for these polymer systems include benzene, toluene butanol, acetate or xylene.

Cross-linking agents for the epoxy resins include acids or amines, or by those substances containing active hydrogen. These nucleophilic curing agents, used in as much as 30 or 40% can be organic acids, mono- or polyamines, or resinous substances such as the phenolic, urea, melamine and sulfonamide resin, as well as polysulfide polymers polyamines (ethylenediamine) and polyamides etc. The relative proportion of curing agent to epoxy resin is not critical, but generally from about 5 to about 50 percent of curing agent employed for this purpose. The resulting epoxy resin upon reaction or cross-linking with these materials no longer have the terminal epoxide groups.

One of the preferred cross-linking agents are the amine containing compounds such as ethylene diamine, diethylene triamine, triethylene tetramine tetraethylene pentamine, and the like. Tertiary amines such as dimethylaminomethylphenol, 2,4,6-tri-(dimethylaminomethyl)phenol and benzyl dimethylamine are also useful cross-linking agents for the epoxides of this invention.

Another preferred group of curing agents for the epoxy resins are the amine salts of fatty acids. These materials are heat-activated curing agents. These amine salts may be obtained by completely or partially neutralizing an amine with a fatty acid. The amines which may be employed for this purpose include methylamine, dimethylamine, trimethylamine, hexamethylenediamine, morpholine and diethylenetriamine. The fatty acids which may be used to form the salts may be either saturated or unsaturated and include formic, acetic, propionic, butyric, caprylic, steric, oleic, linoleic, linolenic, acrylic, methacrylic, crotonic, vinylacetic acid and derivatives thereof. A neutral salt results by combining a mole of the amine with the exact number of moles of fatty acid corresponding to the number of amino groups present in the amine molecule. Since these resins are generally cured at high temperatures, there should be substantial gel structure established in the film prior to subjecting the film to final baking temperatures in order to obtain an opaque film. If substantial gel structure is not established at low temperatures prior to the final baking, the high temperatures will cause the partially gelled film to flow thereby collapsing light scattering voids formed by the non-solvent. The desired gel structure may be obtained in the film at lower temperatures by the addition of a suitable mineral acid or amine activating agent.

Another particularly preferred group of cross-linking agents useful in curing the epoxy resins are the aminoplast resins described hereinabove. However, when using many of the alkoxylated aminoplast resins it will be necessary to incorporate a mineral acid or other curing agent to accelerate the curing at low temperatures so that substantial gel structure may be established prior to final curing as described hereinabove. Among those most preferred aminoplast resins are the alkoxylated melamines and ureas as described hereinabove. Various proportions of epoxy resin and aminoplast cross-linking agent may be employed as the cross-linking resin component of this invention. For example, the aminoplast resin may constitute from about 5 to about 50 percent by weight of the mixture of the resins, although this ratio is not critical.

Other cross-linking agents for the epoxy resins which may be used in accordance with the practice of this invention are the acid curing agents such as acid anhydrides, e.g., succinic, maleic, phthalic acid anhydrides and their derivatives. Various polymerized anhydrides may be used such as polyadipic and polysebacic acid anhydride. Most of the acid curing agents such as the ones mentioned herein cure catalytically in the presence of a mineral acid catalyst at room temperature. In such instances, it is desirable to incorporate from 0.1 to 5% of a mineral acid catalyst to cause initial curing at low temperatures so that substantial gel structure may be established prior to final cure baking. There also may be employed the phenol formaldehyde resins as curing agents for the epoxy resins to obtain extremely durable films. These resins are generally heat activated so it is generally desirable to add an acid or amine curing agent to initiate curing at lower temperatures so the proper gel structure can be established prior to final curing.

Also, advantageous properties are often obtainable by preparing mixtures of two or more of the foregoing thermosetting resins.

The film forming polymeric materials may be added to and dissolved in the solvent as such. Alternatively, the corresponding monomer or monomers may be added to the solvent system and the film forming polymeric material then formed in situ by polymerizing the monomers in the solvent system. Polymerization catalysts, such as organic peroxides, and polymerization modifiers such as tertiary dodecyl mercaptan and carbon tetrachloride may by employed in accordance with well known techniques. If the system contains a polymer containing free hydroxyl groups, a cross linking agent, such as an organic diisocyanate or a conventional aminoplast may be employed. Ethylenically unsaturated monomers may be polymerized in the solvent system in the presence of a preformed polymer in which case there may occur either graft polymerization of the monomer on the preformed polymer or, if the preformed polymer contains ethylenic unsaturation, cross linking of the preformed polymer may occur.

The solvent system which is used in the practice of this invention comprises a mixture of at least two miscible liquids. It is not necessary that any of the liquids used in the solvent system taken individually be a solvent for the film forming polymer so long as the polymer is soluble in them in admixture. At least one of the liquids in the solvent system, however, must be a non-solvent for the polymer and this liquid must have a substantially lower volatility than that of other liquids in the solvent mixture.

As used herein, the term "non-solvent" is used to denote a liquid in which the polymer does not dissolve to any appreciable extent.

The amount of the low volatility non-solvent liquid present in the solvent system is preferably enough to produce upon the removal of the solvent mixture from a film formed from the composition, a Kubelka-Munk scattering coefficient greater than 0.5 reciprocal mils at 4400 angstroms and greater than 0.1 reciprocal mils at 5600 angstroms. However, the amount of the low volatility non-solvent present in the solvent system must be less than that which, upon the removal of the solvent mixture from a film formed from the composition, would produce a discontinuous film—i.e., a film containing interconnected open cells or breaks as contrasted with a continuous film containing non-interconnected cells.

When these requirements are met and a film is formed from the composition, the more volatile liquid evaporates at a greater rate than the low volatility non-solvent. After a portion of the solvent mixture has evaporated, the film forming polymer gels and thereafter, the low volatility non-solvent liquid precipitates as minute droplets in the polymer matrix which forms a rigid structure. Subsequently, the low volatility non-solvent evaporates leaving microscopic voids in the rigid structure. These microscopic voids cause light scattering and opacity and result in the film being microporous and having in the absence of an opacifying a Kubelka-Munk scattering coefficient as previously defined.

If not enough of the lower volatility non-solvent is present in the system prior to establishing a rigid structure as defined hereinabove, a film formed from the composition will dry upon curing as either a clear or a blushed film having a Kubelka-Munk scattering coefficient less than 0.5 reciprocal mils at 4400 angstroms and less than 0.1 reciprocal mils at 5600 angstroms and will not contain sufficient micropores to cause opacity. It will be understood, of course, as described hereinbelow, compositions containing thermosetting resins, solvents therefore and non-solvent having utility in and of themselves despite the fact that under some conditions they will not produce opaque films, e.g., subjecting a thermosetting resin system containing an alkoxylated aminoplast resin to high temperature curing prior to establishing substantial gel structure.

If too much of the lower volatility non-solvent is present in the system prior to obtaining the rigid structure, the polymer may precipitate from the mixture before it gels and a film formed from such a composition will be discontinuous and contain undesirable interconnected or continuous voids throughout the film structure. Such films are not desirable for thin film coatings as contemplated by this invention since these coatings will not offer the desirable protection of most substrates often required by consumers and manufacturers. Furthermore, such films used as coatings, would be highly permeable throughout the film structure and would be capable of allowing undesirable liquids to permeate through open void structure to the substrate coated with such a film.

In order to obtain the desired results of this invention it is important to control the amount of non-solvent in the resin system. Of course, the amount will vary from one solvent to another depending upon the volatility of the liquid non-solvent and the amount of resin in the composition. For example, when employing a non-solvent of very low volatility, a smaller quantity of non-solvent will be needed to obtain the desired results than when employing a highly volatile liquid non-solvent. Preferably, there should be sufficient liquid non-solvent present in the composition as to either lower the viscosity or provide for a composition such that upon evaporation of this solvent from the composition which has been applied as a film will have a Kubelka-Munk scattering coefficient as described above.

The amount of non-solvent can be determined for any particular system by a simple test. However, it has been found that for most of the resin and solvent systems of this invention the ratio of liquid non-solvent to solids content of polymer in parts by weight should be from about 1:3 to about 3:1. Preferably, the ratio should be from about 0.5:1 to about 2.5:1 of non-solvent to polymer solids in parts by weight.

The relative proportions of resin and volatile organic solvent for the polymer are not critical. However, the concentration of the resin solvent should be kept sufficiently low so that the viscosity of the solution is in the proper range for uniform application and ease of coating. Subject to this limitation, the concentration of the resin should obviously be as high as possible in order to minimize the cost of the solvent and to provide a film of the desired thickness to obtain an adequate coating as described hereinabove. The relative proportion of solvent and non-solvent is not critical and will obviously vary depending upon the particular solvent and non-solvent used as well as upon the identity and concentration of the resin employed.

The relationship of the amounts of the miscible liquids which comprise the solvent mixture may best be understood by plotting the actual composition of a three component system on a triangular phase diagram. The composition of such an actual system is illustrated in FIG. 1 wherein the concentration of the higher volatility liquid, methyl ethyl ketone (MEK) is calculated from apex G; the concentration of the lower volatility non-solvent for the polymer, hi-flash aromatic naphtha (HFAN), is calculated from apex A; and the concentration of the film forming, gelable polymer 90% of an acrylic copolymer containing 90% methyl methacrylate and 10% methacrylic acid (MMA—MAAc), and 10% butylated melamine is calculated from apex M. The line E–B is the gel structure line, and the line B–A is the precipitation line. All compositions within the area GEA contain the polymer in the liquid phase. All compositions outside this region contain the polymer in a gel stage. Films having compositions along line E–F upon removal of all solvent are continuous and have Kubelka-Munk scattering coefficients less than 0.5 reciprocal mils at 4400 angstroms and less than 0.1 reciprocal mils at 5600 angstroms. Films having compositions along line B–F upon removal of all solvent are continuous and are white, having Kubelka-Munk scattering coefficients greater than 0.5 reciprocal mils at 4400 angstroms and greater than 0.1 reciprocal mils at 5600 angstroms. Films having compositions along line B–A upon removal of all solvent are discontinuous. The coating compositions of this invention in the particular system illustrated in FIG. 1 are those within the area BFG. A film formed from a composition within this area, such as a composition represented by point I, dries as a very white, tough continuous film. However, a film formed from a composition within the area EFG, such as represented by point J, will dry as a continuous, non-white film as described above; and a film formed from a composition within the area ABG, such as represented by point H, will dry as a discontinuous, possibly white film.

Figure 2:
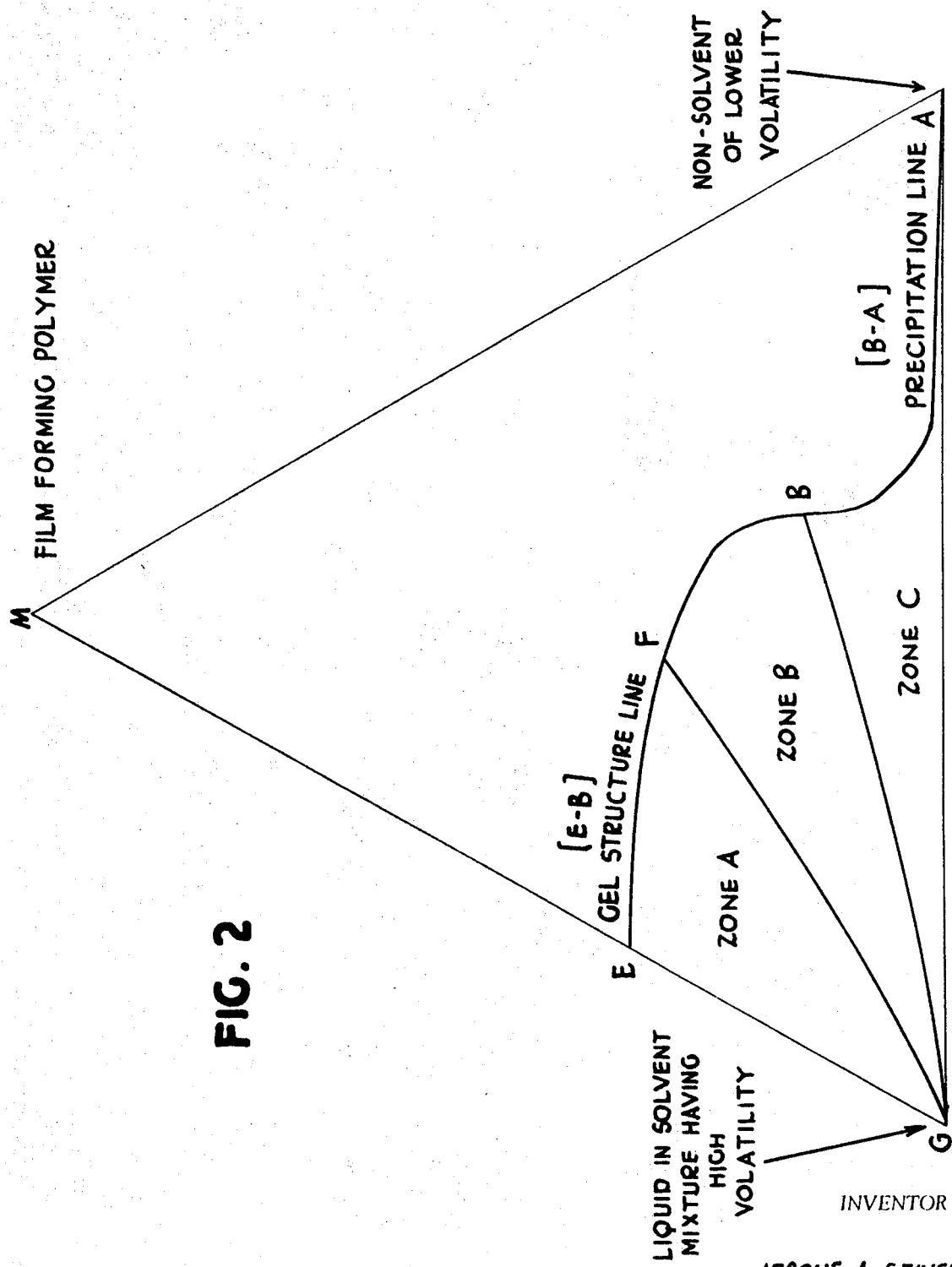

This invention may be further understood by reference to the generalized triangular phase diagram shown in FIG. 2. This diagram shows three distinct zones which are dependent upon the concentration of the materials in the compositions. Coatings deposited from a composition which comes within zone A are continuous, transparent and for the most part non-porous. As the composition approaches the boundary of zone B, the coatings deposited exhibit a blush. Coatings produced from compositions falling within zone C are extreme as compared to those in zone A in that the composition dries as a polymer containing open cell interconnected voids or as a precipitated, powdery, white, discontinuous film. However, coatings produced from compositions in zone B are continuous and exhibit many of the macro-properties of the polymer itself and also exhibit Kubelka-Munk scattering coefficient as previously defined. As the compositions within zone B approach the boundary of zone C, the coatings deposited, upon removal of all solvent, become increasingly white and exhibit higher Kubelka-Munk scattering coefficients. Therefore, the compositions of this invention are those which fall within zone B and pass through line B–F upon removal of solvents. Lines G–F and G–B may be approximated by straight lines when the evaporation rate of the true solvent is much greater than that of the non-solvent.

The particular liquids which are used in the solvent mixture depend upon the particular film forming polymer used. A liquid which is the more volatile component in one system may be the lower volatility non-solvent in a different system. Classes of liquids which may be employed include ketones, esters, ethers, ester-ethers, alcohols, aliphatic, aromatic and chlorinated hydrocarbons and the like.

The volatile liquid organic solvents which have been found particularly useful in the practice of the present invention include alcohols such as methanol, ethanol, propanol, n-butanol, amyl alcohol, cyclohexanol, hexanol, and the like; esters such as methyl acetate, ethyl acetate, isopropyl acetate, butyl acetate, amyl acetate, diethylene glycol monomutyl ether acetate, ethylene glycol monobutyl ether acetate, ethylene glycol monoethyl ether acetate (Cellosolve acetate), 2-ethylhexyl acetate, and the like; ketones such as acetone, methyl ethyl ketone, diisobutyl ketone, ethyl amyl ketone, ethyl butyl ketone, methyl isobutyl ketone, and the like; ethers such as propylene glycol methyl ether, di-propylene glycol methyl ether, and the like; aromatic hydrocarbons such as benzene toluene, xylene; various commercially available mixed aromatic hydrocarbons; chlorinated hydrocarbons such as chloroform, ethylene dichloride, methylchloroform, trichloroethylene dioxide, and the like; and various known aliphatic hydrocarbons. As indicated hereinabove, mixtures of these solvents can be employed as long as the solvents are miscible with the non-solvent and are of higher volatility than the non-solvent.

The non-solvents which have been found particularly useful in the practice of this invention include petroleum fractions, particularly the aliphatic and aromatic hydrocarbon fractions such as odorless aliphatic mineral spirits [boiling point range 349° F.–406° F., refractive index 1.4217 at 20° C., specific gravity 0.754 (60/60° F.) and a Kauri-Butanol value of 25.3], hi-flash aromatic naphtha [boiling point range 367° F.–421° F., refractive index 1.5075 at 20° C., specific gravity 0.893 (60/60° F.) and a Kauri-Butanol value of 89.1], very hi-flash aromatic naphtha [boiling point range 344° F.–533° F., specific gravity 0.926 (60/60° F.) and a Kauri-Butanol value of 100], turpentine (steam distilled) [boiling point range 313° F.–324° F., specific gravity 0.862 (60/60° F.)], hexane, heptane, actane, iso-octane, and the like; alcohols such as methanol, ethanol, propanol, butanol, 2-ethoxyethanol and the like, esters such as butyl acetate, butyl lactate, 2-ethoxyethyl acetate, and the like. The choice of the particular non-solvent liquid will depend, of course, upon the indenitity of the resin selected. A liquid which is a non-solvent for one resin may be a good solvent for another resin, as is well known. The petroleum fractions such as hi-flash aromatic naphtha are particularly preferred for use in the resin systems of this invention because of their very low solvent power for most of these resins.

The compositions of this invention may include other ingredients which will not interfere with the relationship between the film forming, gelable polymer and the solvent mixture containing at least two miscible liquids. Thus, one or more additional polymers may be included to modify the properties of the final film, which polymers need not have the aforedescribed solubility properties relative to the solvent system—i.e. for example, they need not be insoluble in the lower volatility liquid. If it is desired to obtain a film having a color other than white, colored agents such as soluble dyes may be included in the composition.

The compositions of this invention may be formed into a film by techniques well known in the art. Thus, they may be applied as a film by brushing, spraying, dipping, roller coating, knife coating, electrodepositing or calendering.

The compositions of this invention are particularly useful when employed in spray applications due to the presence of the non-solvent in the composition. The compositions of the present invention containing the non-solvent have a lower viscosity at corresponding solids content thereby permitting easier atomization of a higher solids content of resinous material than compositions not containing a non-solvent. Therefore, fewer coats are necessary to obtain the desired thickness of film by spray application using the compositions of this invention.

The compositions of this invention are also useful as paint compositions where it is desirable to decrease the amount of solvent. The compositions of this invention can therefore be prepared at a lower initial cost than previous coating compositions which employ only solvents for the polymer since a smaller amount of expensive solvent is necessary. Furthermore, the liquid non-solvents which may be employed in the practice of this invention, such as the aliphatic hydrocarbon petroleum fractions— e.g., odorless mineral spirits are not nearly as expensive or toxic as most of the solvents in common use today.

Thus, the compositions of this invention are not only useful in that they are capable of producing opaque, microporous films in the obsence of an opacifying pigment, but are also useful in a real commercial sense from the standpoint of raw materials and toxicity.

The compositions of this invention may be applied as films to various types of surfaces or substrates. These surfaces may be of the type whereby the film is to be removed by a suitable method or of the type which is the final substrate such as the metal of an automobile. Among the more suitable surfaces which may be coated with the compositions of this invention are steel, treated steel, galvinized steel, cement, glass, fabrics, fiber glass, wood, plaster board, aluminum, treated aluminum and plastics. The most preferred surfaces are metals such as treated steel and treated aluminum.

Films formed from the compositions of this invention may be air dried, vacuum dried or bake dried at elevated temperatures.

The preferred films produced by the practice of this invention are characterized by the presence therein of a large number of discrete closed cells. Substantially all of these cells or voids are less than 2 micron, and preferably less than 0.5 micron, in size. The size of the cells range downward to the size of the film forming polymer molecule. Films formed from many of the compositions of this invention contain closed cells essentially none of which are larger than 0.1 micron. In other films, the average size of the cells may be 0.25 micron.

Unless some color forming material has been included in the composition, such as a soluble dye, the preferred films of this invention are opaque and white. Colored films may be obtained by incorporating small amounts of dyes.

The coating compositions of this invention may be utilized in automotive finishes, appliance finishes and in similar protective and decorative coatings. Such coatings may have thicknesses ranging up to 10 mils. The coatings of this invention are extremely tough and abrasion resistant due to the cross linking in the resin system.

A film having an apparent thickness of, for example, 10 mils will have a real solid thickness which is equal to the sum of the thickness of each wall between the discrete cells lying along a path perpendicular to the outermost planar surface of the film which may be, for example, no more than 1 ml. This property renders the films of this invention, particularly those having an average cell size of less than 0.1 micron, useful as vapor or liquid permeation membranes which may be utilized for a number of applications such as, for example, in desalinization processes. Thus, the film is of sufficient apparent thickness to provide the required amount of strength; yet the total thickness of solid polymer through which a molecule must pass (i.e., the cell walls) is relatively small.

Furthermore, the diffusion per unit of time of a vapor or a liquid through a unit area of some of the films of this invention is far greater than that in the case of non-porous films heretofore available.

The preferred films of this invention reflect light of wavelengths below 3800 angstroms which makes them useful as ultraviolet light reflectors providing the polymer does not absorb light in the near ultraviolet range. Further, these films are of such whiteness as to be of use as white reflectance standards.

The compositions of this invention ar particularly useful when coated to fibers such as fiber glass, resinous yarns, vegetable or cellulosic yarns and cords. When these fibers or cords are coated with the compositions of this invention, an opaque or white fabric is obtained without the addition of pigments as needed in the fabric heretofore employed. The fact that pigments such as $TiO_2$ are not needed to obtain whiteness in the fibrous fabrics is quite significant since this has been a problem in the art due to the adverse effects these pigments have on the resulting fabrics. For example, it is known that pigments such as $TiO_2$ weakens the tensile strength of the fabric.

The fibers may be coated with the compositions of this invention by any of the well known methods in the art. One method found to be suitable is to dip the fibers into a bath of a composition of this invention which contains resin, solvent and non-solvent in amounts indicated hereinabove. Upon curing, a fabric having the desired whiteness and softness is obtained without the addition of pigments such as $TiO_2$.

The films produced in accordance with the practice of this invention are considerably less dense than a film produced by conventional means. The reason for this fact is that most of the non-solvent for the resin results in the formation of voids in the film. This may be shown by comparing the actual density of any film produced by the practice of the invention to the theoretical density, i.e., the density the film would have if all of the non-solvent had resulted in the formation of voids. This theoretical density may be calculated as follows:

Assume that the volume of resin per 100 gms. of original coating composition—equals A Assume that the volume of non-solvent per 100 gms. of original coating composition—equals B Assume that the volume of non-solvent per 100 gms. of original coating composition after evaporation of the solvent and assuming no evaporation of non-solvent— equals C (A+B=C)

Then the percent by volume of resin in film obtained from 100 gms. of original coating composition after evaporation of the solvent and assuming no evaporation of non-solvent would be:

$$\left[\frac{A}{C} \times 100 = D\right]$$

Theoretical density (actual density of resin times percent calculated in last item above divided by 100) is $$\frac{D \times E \text{ (density of resin)}}{100} = \text{theoretical density}$$

It has been found that the actual density of the films of the invention are nearly the same as the theoretical density. By contrast, the density of the corresponding films of the same resins produced by conventional means, i.e., resin compositions without non-solvent, have a far greater density than the films of this invention.

Figure 3:
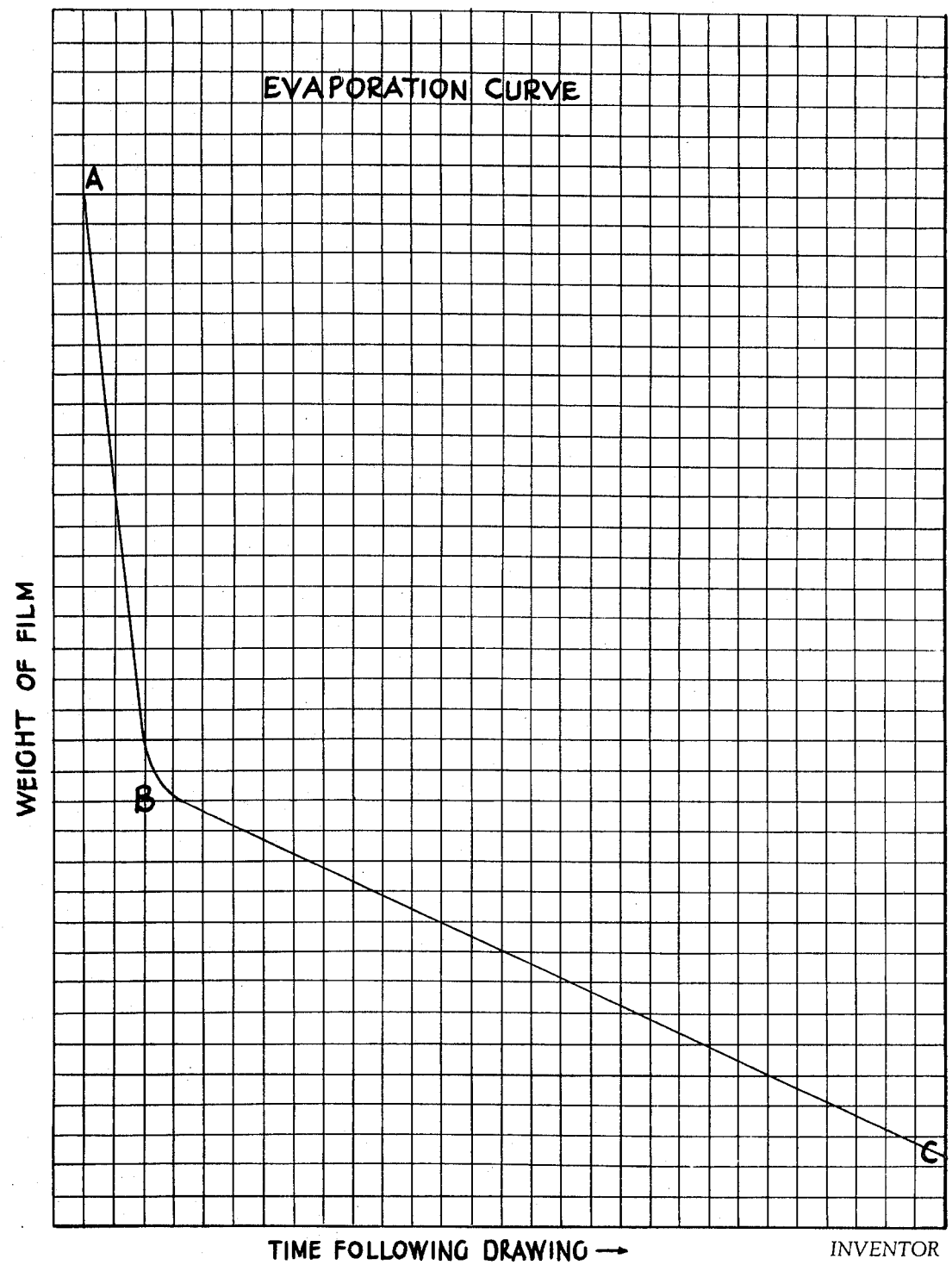

In FIG. 3 of the drawings, there is illustrated a generalized evaporation curve for a typical system of the present invention. The resultant curve illustrates the evaporation rate of the solvent mixture from the drawn film. In the region AB, most of the weight loss is due to the evaporation of the solvent. At some point along the line AB, the resin gels and at some time later, the non-solvent precipitates as minute droplets in the resin matrix. Evaporation of most of the non-solvent proceeds along line BC. After all of the non-solvent has evaporated, there remains the opaque, microporous film of the resin.

As indicated previously, the films of this invention have a Kubelka-Munk scattering coefficient greater than 0.5 reciprocal mil at 4400 angstroms and greater than 0.1 reciprocal mil at 5600 angstroms. In determining whether a particular film falls under the aforementioned criteria, the films may be tested by methods known in the art. Reference, of course, being made to the equations indicated hereinabove.

The compositions to be tested may be applied at various controlled film thicknesses over white and black glass and over steel panels and allowed to dry thoroughly. The total reflectances as well as the non-specular reflectances is preferably measured with a recording spectrophotometer equipped with a digital tristimulus integrator (abbreviated subsequently as TSI). The reflectances should be recorded at 200 angstrom intervals from the digital readout of the TSI for the film over white, R, the film over black, Ro, and for the white glass substrate, Rg. All measurements being made relative to pressed BaSO$_4$ white standard, which has an average absolute reflectance equal to about 97.5%. All readings would be corrected to absolute reflectance by multiplying them by 0.975. [More correctly, an exact correction should be made for each wavelength, but the error in using 0.975 is only about 1% maximum].

Correctiions are made for the surface reflectance according to the following equation:

$$R^1 = k_1 + \frac{(1-k_1)(1-k_2)R}{1-k_2R}$$

wherein $R^1$ is the toal reflectance, R is the internal reflectance (used in the Kubelka-Munk equation) $k_1$ is the first surface Fresnel reflection (gloss), and $k_2$ is the correction for the reflectance from the underside of the surface-air interface. Values of 0.04 for $k_1$ and 0.40 for $k_2$ are used in these calculations. [See further Saunderson, J. L., J. Opt. Soc. Am. 32, 727–36 (1942).]

The scattering and absorption coefficients may be calculated from Equation 4. A TiO$_2$ pigmented film having no voids may also be measured and computed in like fashion, as a point of comparison. For comparison purposes, the scattering coefficients determined may be calculated to a film thickness of 1 mil. The TiO$_2$ being calculated to 100% by weight dry pigment, 1 mil thickness basis for comparison.

R∞ may be determined from a–b except for the TiO$_2$ in which case it is measured. The materials of this invention have very high reflectance and in many instances are whiter at complete hiding than corresponding films containing TiO$_2$.

The apparent absorption coefficient, K, is probably not a true absorption except for TiO$_2$ at 4400 angstroms and lower wavelengths. What appears as absorption is probably light loss from multiple scattering.

The examples which follow illustrate the best modes contemplated for carrying out this invention. In many of these examples, the polymeric materials are referred to by the designations set forth below.

POLYMER A

Cellulose acetate butyrate containing 26% butyryl groups, 20% acetyl groups and 2.5% hydroxyl groups having a viscosity in seconds of from 15 to 35 and having a viscosity in poises of from 56 to 131 as determined by A.S.T.M. Method D–871–54T and viscosities in poises are converted to A.S.T.M. seconds equivalent to values obtained under A.S.T.M Method D–871–48

POLYMER B

Cellulose acetate butyrate containing 17% butyryl groups, 29% acetyl groups and 1.5% hydroxyl groups having a viscosity in seconds of from 31 to 50 and having a viscosity in poises of from 56 to 131 as determined by the A.S.T.M. methods indicated hereinabove for Polymer A.

POLYMER C

Cellulose acetate containing 39.9% acetyl groups having a viscosity in seconds of 17 to 35 and having a viscosity in poises of from 64 to 132 as determined by A.S.T.M. Method D–1343–56 in the solution described as Formula A, A.S.T.M. Method 7 D–871–56.

POLYMER D

Moisture curable polyurethane solution at 42% solids (Transco 542 F.).

POLYMER E

Epoxidized polyester resin plasticizer at 75% solids in isopropyl acetate which is the reaction product of an alicyclic diepoxide with a polyester made from adipic acid or azelaic acid esterified with 1,3-butylene glycol.

POLYMER F

Cellulose acetate butyrate containing 37% butyryl groups, 15% acetyl groups and 2% hydroxyl groups having a viscosity in seconds of from 17 to 33 and having a viscosity in poises from 64 to 124, as determined by the A.S.T.M. methods indicated herein above for Polymer A.

COPOLYMER A

Copolymer of 5% N-butoxy methyl acrylamide, 2.5% methacrylic acid, 27.5% styrene and 65% ethyl acrylate at 50% solids in a solvent mixture of 25% butanol and 75 hi-flash aromatic naphtha and having Gardner-Holdt viscosity of U–V.

COPOLYMER B

Butylated copolymer containing 15% acrylamide, 2.5% methacrylic acid, 38.5% styrene and 44% methyl methacrylate at 50 solids in a solvent mixture of 50% butanol and 50% toluene and having a Gardner-Holdt viscosity of S–X.

COPOLYMER C

Butylated copolymer containing 15 acrylamide, 2.5% methacrylic acid, 38.5% styrene and 44% methyl methacrylate at 50% solids in a solvent mixture of 50% butanol and 50% hi-flash aromatic naphtha and having a Gardner-Holdt viscosity of S–W.

COPOLYMER D

The copolymer is prepared by charging into a reactor equipped with an agitator, thermometer, and reflux condenser and addition funnel 1400 parts by weight of toluene. The reactor is heated to reflux (225° F.). The following premix monomers, solvent and catalyst are added to the reactor over a two hour period:

| | Parts by weight |
|---|---|
| Methacrylic acid | 28 |
| Hydroxypropyl acrylate | 56 |
| Methyl methacrylate | 1337 |
| Toluene | 185 |
| Azo-bis(isobutyronitrile) | 5.4 |

Catalyst and toluene are added over a three hour period and held for one hour for complete monomer conversion as follows:

| | Parts by weight |
|---|---|
| Toluene | 745 |
| Azo-bis(isobutyronitrile) | 5.3 |
| There is then added toluene | 280 |

Final characteristics of copolymer:

| | |
|---|---|
| Solids (percent) | 35.5 |
| Viscosity (Gardner-Holdt) | T–U |
| Acid value of solution | 4.2 |

COPOLYMER E

The copolymer is prepared in the same manner as described for the preparation of Copolymer D except that in place of the initial charge of 1400 parts of toluene there is charged 900 parts by weight of toluene and 500 parts by weight of butanol.

Final characteristics of the copolymer:

| | |
|---|---|
| Solids (percent) | 34 |
| Viscosity (Gardner-Holdt) | J–K |
| Acid value of solution | 4.61 |

COPOLYMER F

The copolymer is prepared by charging into a reactor equipped with an agitator, thermometer and reflux condenser and addition funnel an initial charge of 900 parts by weight of toluene and 400 parts by weight of butanol. The reactor is heated to reflux. The following premix monomers, solvent and catalyst are added to the reactor over a period of two hours:

| | Parts by weight |
|---|---|
| Acrylamide | 28 |
| Butanol | 100 |
| Hydroxyethyl methacrylate (30% solution in toluene | 187 |
| Azo-bis(isobutyronitrile) | 5.4 |
| Methyl methacrylate | 1291 |
| Methacrylic acid | 36.5 |

There is then added 18.5 cc. of ethyleneimine and 50 parts by weight of toluene.

Thereafter there is added over a three hour period additional catalyst and toluene and held for one hour to complete monomer conversion.

| | Parts by weight |
|---|---|
| Azo-bis(isobutyronitrile) | 5.3 |
| Toluene | 745 |

Final characteristics of the copolymer:

| | |
|---|---|
| Solids (percent at 150° C.) | 38.7 |
| Viscosity (Gardner-Holdt) | Z–Z$_1$ |
| Color (Gardner) | 1$^-$ |
| Acid value of solution | 1.4 |

COPOLYMER G

The copolymer is prepared by charging into a reactor equipped with an agitator, thermometer, and reflux condenser and addition funnel 900 parts by weight of toluene and 400 parts by weight of butanol. The following premix monomers, solvent and catalyst are added to the reactor over a two hour period:

| | Parts by weight |
|---|---|
| Acrylamide | 28 |
| Butanol | 100 |
| Hydroxyethyl methacrylate (30% solution in toluene | 187 |
| Hydroxypropyl methacrylate (40%), methacrylic acid (6%) and toluene (54%) | 140 |
| Azo-bis(isobutyronitrile) | 5.4 |
| Methyl methacrylate | 1235 |
| Methacrylic acid | 36.5 |

There is then added 18.5 cc. of ethyleneimine and 50 parts by weight of toluene.

Catalyst and toluene premix are added over a three hour period and then held for one hour to complete monomer conversion at reflux temperature.

| | Parts by weight |
|---|---|
| Azo-bis(isobutyronitrile) | 5.3 |
| Toluene | 745 |

Final characteristics of the copolymer:

| | |
|---|---|
| Solids (percent at 150° C.) | 38.7 |
| Viscosity (Garner-Holdt) | Z–3 |
| Color (Gardner) | 1$^-$ |
| Acid value of solution | 2.54 |

COPOLYMER H

Butylated copolymer containing 38.9% solids content of a polymer consisting of 91.25% methyl methacrylate, 2.0% acrylamide, 4.25% methacrylic acid reacted with ethyleneimine dissolved in a liquid mixture of 73% toluene, 21.5% butanol and 5.5% xylene.

COPOLYMER I

The copolymer is prepared by charging into a reactor equipped with an agitator, thermometer, and reflux condenser and addition funnel 341 parts by weight of xylene and 100 parts by weight of butanol. The reactor is heated to reflux. The following premix monomers, solvent and catalyst are added to the reactor over a three hour period:

| | Parts by weight |
|---|---|
| Hydroxypropyl acrylate | 169 |
| Methacrylic acid | 12.6 |
| Styrene | 315 |
| 2-ethylhexyl acrylate | 315 |
| Butyl methacrylate | 126 |
| Methyl methacrylate | 121 |
| Acrylamide | 21 |
| Tertiary dodecyl mercaptan | 5.2 |

After the final addition of the above there is added 25 parts by weight of xylene and 4 cc. of ethyleneimine. Catalyst and xylene are then added in the following amounts over a three hour period:

| | Parts by weight |
|---|---|
| Xylene | 177 |
| Azo-bis(isobutyronitrile) | 5.1 |

The solution is refluxed for an additional hour after all of the foregoing materials are added and thereafter 250 parts by weight of xylene are added to the solution of solvents and copolymer.

Final characteristics of the copolymer:

| | |
|---|---|
| Solids (percent) | 48.5 |
| Viscosity (Gardner-Holdt) | U+ |
| Acid value of solution | 2.91 |
| Color (Gardner) | 1+ |

AMINOPLAST RESIN A

Butylated melamine formaldehyde resin at 50% solids in a solvent mixture of 80% butanol and 20% xylene, made from 6.0 moles of formaldehyde and 4 moles of butanol per mole of melamine and having a Gardner-Holdt viscosity of G–K.

AMINOPLAST RESIN B

Butylated melamine formaldehyde resin at 65% solids in a solvent mixture of 80% butanol and 20% xylene made from 5.5 moles of formaldehyde and 6.6 moles of butanol for each mole of melamine and having a Gardner-Holdt viscosity of A–D.

AMINOPLAST RESIN C

A water soluble hexamethoxymethyl melamine.

EXAMPLE 1

A coating composition is prepared by slowly dissolving 40 gms. of Polymer A in 160 gms. of acetone. To this clear solution, 100 gms. of Copolymer A are slowly added and the entire mixture is thoroughly agitated until a homogeneous solution is obtained. To this solution there is added slowly while stirring 35 gms. of a non-solvent, hi-flash aromatic naphtha. After all of the non-solvent is added the solution is stirred until a homogeneous solution is obtained. The coating composition is cast as a film on a suitable substrate. The resulting film is transparent in appearance upon drying.

EXAMPLE 2

The same procedure as described in Example 1 is followed except that 70 gms. of the non-solvent, hi-flash aromatic naphtha are added instead of 35 gms. A film cast from this solution is initially transparent, but becomes a very white high gloss film upon drying. The dried film is then baked for 20 minutes at 200° F. and the resulting film is a clear, tough glossy coating.

EXAMPLE 3

A coating composition is prepared by slowly dissolving 40 gms. of Polymer A in 160 gms. of acetone. To this solution 100 gms. of Polymer D are slowly added while stirring and the entire mixture is agitated until all of the materials are dissolved and a homogeneous solution is obtained. To this solution there is added slowly while stirring 60 gms. of hi-flash aromatic naphtha. The solution is stirred further until a homogeneous solution is obtained. The resulting solution is cast as a film to 3 mils thickness. The film is initially transparent but becomes white upon air drying at room temperature. The dried film is white, tough, continuous and microporous and has a Kubelka-Munk scattering coefficient of greater than 0.5 reciprocal mils at 4400 angstroms and greater than 0.1 reciprocal mils at 5600 angstroms.

EXAMPLE 4

A coating composition is prepared by slowly dissolving 200 gms. of Polymer A in 800 gms. of acetone. To this solution there is slowly added 500 gms. of Aminoplast Resin A and thereafter 2.5 gms. of concentrated phosphoric acid as a catalyst. The entire mixture is thoroughly agitated until all the materials are completely dissolved. To this solution there is slowly added while stirring, 500 gms. of hi-flash aromatic naphtha. The solution is further stirred until a homogeneous solution is obtained. A film drawn from this solution is initially transparent, but becomes white upon air drying. The film is air dried for one hour at which time the film is tack-free (cotton threads no longer adhere to the surface of the film). The film is then baked for 20 minutes at 200° F. The resulting film is a white, mar resistant coating which is continuous and microporous and has a Kubelka-Munk scattering coefficient of greater than 0.5 reciprocal mils at 4400 angstroms and greater than 0.1 reciprocal mils at 5600 angstroms.

EXAMPLE 5

A coating composition is prepared by slowly dissolving 200 gms. of Polymer A in 800 gms. of acetone. To this solution there is added slowly while stirring 350 gms. of an acrylic copolymer containing hydroxy groups (specifically a copolymer of 30% 2-ethylhexyl acrylate, 30% styrene, 12% butyl methacrylate, 18% methyl methacrylate, 4% hydroxyethyl methacrylate, 4% hydroxypropyl methacrylate and 2% methacrylic acid having 50% solids in a solvent mixture comprising 90% xylene and 10% butanol, having a viscosity (Gardner-Holdt) of U and an acid value based on the solution of 7.9) and 150 gms. of Aminoplast Resin A, and 10.0 gms. of concentrated phosphoric acid as a catalyst. The entire mixture is thoroughly stirred until all of the ingredients are dissolved and a homogeneous solution is obtained. The composition is formed into a film of 3 mils in thickness and air dried at room temperature for one hour whereby the film becomes tack-free as indicated by the cotton test. The air dried film is hazy in appearance. This film is then baked in an oven for 20 minutes at 200° C. The resulting film remains hazy in appearance and is a mar resistant, hard coating.

EXAMPLE 6

To 500 gms. of the coating solution prepared in Example 5, there is slowly added while stirring 50 gms. of hi-flash aromatic naphtha as a non-solvent. Upon further stirring a homogeneous solution is obtained and the composition is formed into a film and air dried for one hour as described in Example 5. The film after air drying has a hazy appearance nearly the same as described in the previous example. The film is baked in the same manner as described in Example 5 and the resulting film remains hazy in appearance.

EXAMPLE 7

The same procedure as described in Example 6 is followed except that in place of 50 gms. of non-solvent there is added 100 gms. of hi-flash aromatic naphtha. The solution is formed into a film of 3 mils in thickness and air dried in a manner described above in Example 5. Upon air drying the film appears white. The film is then baked in an oven for 20 minutes at 200° F. The resulting film is an off-white, mar resistant, hard coating.

EXAMPLE 7A

The same procedure as described in Example 7 is followed except that in place of 100 gms. of hi-flash aromatic naphtha there is added 150 gms. of the void forming non-solvent. Upon air drying of the film formed from the foregoing composition, the film appears as a good white. The film maintains the white appearance after baking for 20 minutes at 200° F.

EXAMPLE 8

A coating composition is prepared by slowly dissolving 60 gms. of Polymer A in 240 gms. of acetone by stirring the mixture until all the solids are dissolved. To this solution there is slowly added while stirring 172 gms. of hi-flash aromatic naphtha. Stirring is continued until a homogeneous solution is obtained. To the homogeneous solution there is slowly added while stirring 20.0 gms. of toluene diisocyanate as a cross linking agent. The coating composition is then quickly cast as a film having a thickness of 3 mils. The film dries to a tough white film having a Kubelka-Munk scattering coefficient of greater than 0.5 reciprocal mils at 4400 angstroms and greater than 0.1 reciprocal mils at 5600 angstroms.

EXAMPLE 9

A coating composition is prepared by slowly dissolving 100 gms. of Polymer B in 400 gms. of acetone at 150° F. While continually stirring there is added to this solution 300 gms. of Copolymer A. Stirring is continued and 150.0 gms. of hi-flash aromatic naphtha are slowly added. After a homogeneous solution is obtained the composition is cast as a film having a thickness of 3 mils. The films is air dried for one hour and appears white. The film is then placed in an oven for 20 minutes at 200° F. to cure the resin. The resulting film is a clear, mar resistant, hard surface.

EXAMPLE 10

A coating composition is prepared by slowly dissolving 100 gms. of Polymer B in 800 gms. of acetone. To this solution there is added 300 gms. of Copolymer B. The entire mixture is stirred until a homogeneous solution is obtained. To this solution there is added an additional 600 gms. of acetone and 1.5 gms. of concentrated phosphoric acid as catalyst while continually stirring. Thereafter, 250 gms. of hi-flash aromatic naphtha are slowly added and the mixture is stirred until a homogenous solution is obtained. The coating composition is then cast as a film and air dried for one hour. At the end of one hour the film is tack-free as indicated by the cotton test. The air dried film is white in appearance. The air dried film is then baked in an oven for 20 minutes at 200° F. The resulting film is a white mar resistant, hard coating having Kubelka-Munk scattering coefficient as described above. The cured film is soaked in acetone and dried. The film retains its adhesion and whiteness.

EXAMPLE 11

A coating composition is prepared by slowly dissolving 100 gms. of Polymer B is 600 gms. of acetone. 300 gms. of Copolymer C and 22.5 gms. of Aminoplast Resin B, are thereafter added to this solution. The entire mixture is thoroughly stirred until all of the solids are dissolved and a clear homogeneous solution is obtained. To this solution there is added 800 gms. of acetone and 1.5 gms. of concentrated phosphoric acid while stirring. Thereafter, 250 gms. of hi-flash aromatic naphtha are slowly added while stirring until a homogeneous solution is obtained. A film is cast from this coating composition to 3 mils thickness. The film is air dried for one hour. At the end of one hour the film is tack-free as indicated by the cotton test. The air dried film is white in apperance. The dried film is then baked in an oven for 20 minutes at 200° F. to finally cure the resin. The resulting film is a white, mar resistant tough coating having a Kubelka-Munk scattering coefficient as described in Example 8.

EXAMPLE 12

A coating composition is prepared by adding slowly with agitation 50 gms. of Polymer B to 500 gms. of acetone. The mixture is stirred until a clear solution is obtained. To this solution there is added while stirring 100 gms. of Polymer H and 7.5 gms. of Aminoplast Resin B. To this solution there is then slowly added while stirring 60 gms. of hi-flash aromatic naphtha and 0.5 gm. of concentrated phosphoric acid. After a homogeneous solution is obtained there is added 500 gms. of acetone. Thereafter, 60 gms. of hi-flash aromatic naphtha are slowly added with agitation. A film is cast from this coating composition having a thickness of 3 mils. The film is air dried for one hour and at this point the film is tack-free to the cotton test. The air dried film appears very white with a low gloss. The film is then baked for 20 minutes at 200° F. The resulting film remains very white and has a Kubelka-Munk scattering coefficient as described in Example 8.

EXAMPLE 13

A coating composition is prepared by dissolving 50 gms. of Polymer B in 500 gms. of methyl ethyl ketone. The mixture is stirred until a clear solution is obtained. To this solution there is added slowly while stirring 100 gms. of Polymer H and 7.5 gms. of Aminoplast Resin B. To this solution there is slowly added while stirring 60.0 gms. of hi-flash aromatic naphtha and 0.5 gm. of concentrated phosphoris acid. After a homogeneous solution is obtained by stirring the aforementioned materials there is slowly added 60 gms. of hi-flash aromatic naphtha and 500 gms. of methyl ethyl ketone. After a homogeneous solution is obtained, the composition is cast as a film having a film thickness of 3 mils. The film is air dried for one hour at which time the film is tack-free as indicated by the cotton test. The air dried film is a good white coating with a semi-gloss and fairly tough. The film is then baked in an oven for 20 minutes at 200° F. The resulting film is a white, mar resistant coating having a Kubelka-Munk scattering coefficient as described above in Example 8.

EXAMPLE 14

A coating composition is prepared by dissolving 50 gms. of Polymer B in 1000 gms. of acetone. The mixture is stirred until a clear solution is obtained. To this solution there is added slowly while stirring 100 gms. of Copolymer B, 7.5 gms. of Aminoplast Resin B and 0.5 gm. of concentrated phosphoric acid. To this solution there is slowly added while stirring 180 gms. of hi-flash aromatic naphtha. The entire mixture is stirred until a homogeneous solution is obtained. The composition is sprayed on an aluminum panel substrate as a film and allowed to air dry for one hour. At the end of one hour the film is tack-free as indicated by the cotton test and appears white. The film is then baked in an oven for 20 minutes at 200° F. The resulting film is a white, microporous fairly tough coating having a Kubelka-Munk scattering coefficient as described above in Example 8.

EXAMPLE 15

A coating composition is prepared by slowly dissolving with agitation 100 gms. of Polymer B in 2000 gms. of acetone. The mixture is stirred until a clear solution is obtained. To this solution there is added while stirring 200 gms. of Polymer F, 6.0 gms. of Epon 1001 (a glycidyl ether of bisphenol A produced by Shell Chemical Corp.) and 15.8 gms. of Polymer E as a plasticizer. The entire mixture is stirred until a homogeneous solution is obtained. This composition is cast as a film and allowed to air dry for one hour. At the end of this hour the film appears as a clear pliable film. The film is then baked in an oven for 20 minutes at 200° F. The resulting film is a fairly tough clear film.

EXAMPLE 16

As a comparison, 8 gms. of hi-flash aromatic naphtha are slowly added while stirring to 116 gms. of the coating composition of Example 15. Stirring is continued until a homogeneous solution is obtained. The composition is then cast as a film and allowed to air dry for one hour. At the end of this hour the film appears white. The film is then baked in an oven to cure for 20 minutes at 200° F. The resulting film is a white, microporous, tough coating.

EXAMPLE 17

A coating composition is prepared by slowly dissolving with agitation 50 gms. of Polymer B in 1000 gms. of acetone. The mixture is stirred until a clear solution is obtained. To this solution there is added while stirring 100 gms. of Copolymer B, 10.8 gms. of Aminoplast Resin B, 3.6 gms. of Epon 1001, 9.5 gms. of Polymer E and 0.7 gm. of concentrated phosphoric acid. The entire mixture is stirred until a homogeneous solution is obtained. The composition is cast as a film and air dried for one hour. The air dried film is a clear and pliable coating. The film is then baked in an oven for 20 minutes at 200° F. The resulting cured film is a clear, mar resistant coating.

EXAMPLE 18

As a comparison, 8 gms. of hi-flash aromatic naphtha are slowly added while stirring to 116 gms. of the coating composition prepared in Example 17. Stirring is continued until a homogeneous solution is obtained. The composition is then cast as a film and allowed to air dry for one hour. At the end of this hour the film appears as a white, pliable coating. The film is then baked in an oven for 20 minutes at 200° F. The resulting film is a mar resistant, microporous, white coating having a Kubelka-Munk scattering coefficient as described above in Example 8.

EXAMPLE 19

A coating composition is prepared by slowly dissolving with agitation 100 gms. of Polymer C in 2000 gms. of acetone. The mixture is stirred until a clear solution is obtained. To this solution there is slowly added while stirring 200 gms. of Polymer F, 21.6 gms. of Aminoplast Resin B, 7.2 gms. of Epon 1001, 19.0 gms. of Polymer E and 1.4 gms. of concentrated phosphoric acid. The entire mixture is agitated by stirring until a clear homogeneous solution is obtained. To this solution there is slowly added while stirring 120 gms. of hi-flash aromatic naphtha. Stirring is continued until a homogeneous solution is obtained and the composition is cast as a film. The film is allowed to air dry for one hour at which time the film is tack-free as indicated by the cotton test. The film appears as a white pliable coating. The film is then baked in an oven for 20 minutes to rapidly cure the resin at 200° F. The resulting film is a mar resistant, white, microporous film having a Kubelka-Munk scattering coefficient as described above in Example 8.

The following example illustrates the practice of this invention with a solvent system in which none of the liquids individually are a solvent for the polymer but are a solvent for the polymer in combination.

EXAMPLE 20

A coating composition is prepared by slowly mixing together while stirring a solution comprising 700 gms. of toluene, 300 gms. of ethanol, 50 gms. of Polymer B, 100 gms. of Copolymer B, 7.5 gms. of Aminoplast Resin B and 0.5 gm. of concentrated phosphoric acid. The entire mixture is continually stirred until all of the solids are thoroughly mixed and dissolved. To this solution there is slowly added while stirring 180 gms. of hi-flash aromatic naphtha. The solution is stirred further to obtain a homogeneous solution. The coating composition is then sprayed upon a substrate as a film. The initial evaporation is predominantly ethanol and toluene. When enough of this mixture has been depleted from the system, gelation occurs (after about one hour of air drying and the film begins to become tack-free). After gelation, continued evaporation predominantly of this mixture finally causes phase separation wherein hi-flash aromatic naphtha and some of the toluene precipitate as very small droplets. Final evaporation of all the solvent yields a continuous, opaque white film and the film is tack-free. The film is then baked for 20 minutes to rapidly cure the film at 200° F. The resulting film is a continuous, microporous white, mar resistant coating having a Kubelka-Munk scattering coefficient as described above in Example 8.

EXAMPLE 21

A coating composition to be used in preparing a colored film is prepared by mixing together a solution comprising 800 gms. of methyl methacrylate, 400 gms. of xylene, 16 gms. of tertiary dodecyl mercaptan, 2.0 gms. of tertiary butyl peroxy isopropyl carbonate and 2.0 gms. of tertiary dodecyl mercaptan. The solution is thoroughly mixed and while continually stirring there is added slowly 600 gms. of hi-flash aromatic naphtha. The solution is then refluxed for one hour. To the refluxed solution there is slowly added over a period of 4 hours 400 gms. of xylene and 2 gms. tertiary dodecyl mercaptan, 2.0 gms. of azo-bis-(isobutyronitrile), and the mixture is further refluxed for an additional hour. A 100 gm. portion of the refluxed solution is admixed with 200 gms. of a solution comprising 10% of Polymer A in 90% acetone, to make a composite coating composition of 300 gms. To this 300 gm. composite there is added 3.0 gms. of magenta dye in 300 gms. of acetone. The composition is sprayed onto a substrate and dried. The dry microporous film is a rose red color.

EXAMPLE 22

A coating composition is prepared by admixing and heating a reflux for one hour the following: 1600 gms. of methyl methacrylate, 1200 gms. of hi-flash aromatic naphtha, 800 gms. of xylene, 32 gms. of tertiary dodecyl mercaptan, 4.0 gms. of tertiary butyl peroxide isopropyl carbonate, and 4.0 gms. of azo-bis(isobutyronitrile). A 200 gm. portion of this solution is admixed with a solution comprising 20% by weight of cellulose acetate butyrate (Polymer A) in 200 gms. of acetone and with an additional 200 gms. of acetone. To a 100 gm. portion of this solution there are added 1.60 gms. of green pigment paste comprising 12% Heliogen green pigment, 30% acrylic copolymer (50% solids), 55.5% xylene and 2.5% butanol, and the composition is thoroughly mixed. A film sprayed with this mixture is an opaque green upon drying.

EXAMPLE 23

When the above procedure is repeated substituting an aluminum pigment (0.63 g.) comprising 30% aluminum (Alcoa 1595 pigment), 16.17% xylene, 25% acrylic copolymer (50% solids) and 2.53% butanol, for the green pigment paste and the composition is sprayed, an opaque gray film is obtained.

EXAMPLE 24

A coating composition is prepared by admixing the following materials while stirring: 750 gms. of methyl ethyl ketone, 50 gms. of Aminoplast Resin A, 50 gms. of Polymer A, 175 gms. of Copolymer D, and 2.7 gms. of a 75% solution of butyl hydrogen phosphate as a cross linking catalyst. The entire mixture is stirred until all of the solids are dissolved and a clear solution is obtained. Thereafter 175 gms. of hi-flash aromatic naphtha are slowly added with stirring. The resulting composition is stirred until a clear homogeneous solution is obtained. The clear solution is then applied to an aluminum panel and allowed to air dry for one hour at which time the film is tack-free in accordance with the cotton test. The film appears as a good white coating. The film is thereafter baked in an oven for 20 minutes at 250° F. to accelerate the curing. The baked film retains its white appearance and has a Kubelka-Munk scattering coefficient as described above in Example 8.

EXAMPLE 25

A coating composition is prepared by admixing the following materials while stirring: 750 gms. of methyl ethyl ketone, 50 gms. of Polymer A, 50 gms. of Aminoplast Resin A, 175 gms. of Copolymer E and 2.7 gms. of a 75% solution of butyl hydrogen phosphate as catalyst. The entire mixture is stirred further until all of the solids are dissolved and a homogeneous solution is obtained. While stirring there is slowly added to the aforementioned clear solution 175 gms. of hi-flash aromatic naphtha. Stirring is continued until a clear homogeneous solution is obtained. The composite solution is applied to an aluminum substrate and allowed to air dry. After one hour the film is tack-free in accordance with the cotton test and appears as a white coating. The film is then baked in an oven for 20 minutes at 250° F. The resulting baked film retains its white appearance except for some yellowing in parts of the film. The film is a tough, mar resistant film with fair adhesion.

EXAMPLE 26

A coating composition is prepared by admixing the following materials while stirring: 375 gms. of methyl ethyl ketone, 50 gms. of Polymer A, 42 gms. of Aminoplast Resin B, 200 gms. of butanol, 175 gms of Copolymer F and 15 gms. of Epon 1001 (a glycidyl ether of bisphenol A having an average molecular weight of about 1000 and a melting point of about 64–76° C.). To the foregoing mixture there is added slowly while stirring 175 gms. of hi-flash aromatic naphtha. The solution after stirring for a short period of time becomes a clear homogeneous coating composition.

The effect that a mineral acid catalyst has on establishing adequate gel structure at room temperature and thereby preventing the film to flow which will collapse the voids in the film during baking is set forth in the following comparative tests:

Four (4) aliquot samples of 200 gms. each are taken from the coating composition prepared above. Varying amounts of a 75% solution of butyl hydrogen phosphate catalyst are added to three of the samples and one of the samples contains no catalyst. The four (4) coating compositions are each sprayed on three separate aluminum panels for evaluation with 2 coats on each panel. The panels are allowed to dry at room temperature for one hour. After one hour of drying at room temperature the panels are evaluated and then baked for 30 minutes at 150° F. and then for 30 minutes at 250° F. After baking, the panels are evaluated again. The results of this comparative test are set forth in Table A.

EXAMPLE 27

A coating composition is prepared by dissolving the following materials by agitation: 375 gms. of methyl ethyl ketone, 50 gms. of Polymer A, 42 gms. of Aminoplast Resin B, 200 gms. of butanol, 175 gms. of Copolymer G and 15 gms. of Epon 1001. The entire mixture is stirred until all of the solids have dissolved and a homogeneous clear solution is obtained. To the clear solution there is slowly added while stirring 175 gms. of hi-flash aromatic naphtha. The mixture is stirred until a clear homogeneous coating composition is obtained.

The effect that a mineral acid catalyst has on establishing adequate gel structure at room temperature and thereby preventing the film to flow which will collapse the voids in the film during baking is set forth in the following comparative tests:

Four (4) aliquot samples of 200 gms. each are taken from the coating composition prepared above. Varying amounts of a 75% solution of butyl hydrogen phosphate catalyst is added to three (3) of the samples, one of the samples contains no catalyst for the purpose of comparison. The four (4) coating compositions are each sprayed on three separate aluminum panels for evaluation with only 2 coats on each panel. The panels are allowed to dry at room temperature for one hour. After the one hour of drying at room temperature the panels are evaluated and baked for 30 minutes at 150° F. and then for 30 minutes at 250° F. The panels were evaluated again. The results of this comparative test are set forth in Table A.

TABLE A

| | Amount of catalyst added, gms. | Appearance before baking | Appearance after baking |
|---|---|---|---|
| 26a | 0.0 | White | Clear. |
| 26b | 0.1 | do | White. |
| 26c | 0.2 | do | Do. |
| 26d | 0.5 | do | Do. |
| 27a | 0.0 | do | Clear. |
| 27b | 0.1 | do | White. |
| 27c | 0.2 | do | Do. |
| 27d | 0.5 | do | Do. |

The foregoing comparison illustrates the unexpected effect of a cross linking activator on the voids in the films of this invention with the more inactive cross linking agents which are heat curable. Where the films are designated as being white, they have a Kubelka-Munk scattering coefficient as described in Example 8. All of the cured films, including Example 27a, are tough, mar resistant coatings.

EXAMPLE 28

A coating composition is prepared by admixing and dissolving the following materials by stirring: 375 gms. of methyl ethyl ketone, 50 gms. of Polymer A, 58 gms. of Aminoplast Resin B, 200 gms. of butanol, 175 gms. of Copolymer G and 10 gms. of Epon 1001. After the foregoing solution is thoroughly mixed and the solids are dissolved there is then slowly added to the clear solution 175 gms. of hi-flash aromatic naphtha. Stirring is continued until a clear homogeneous solution is obtained. The foregoing coating composition is compared in the same manner described in Examples 26 and 27, with the same results (i.e., the sample which contained no catalyst is white upon air drying, but becomes a clear tough, mar resistant film upon baking). The samples which contain as little as 0.1 gm. of a 75% solution of butyl hydrogen phosphate catalyst retain their whiteness upon baking.

EXAMPLE 29

To demonstrate the use of other mineral acid catalyst, a 200 gms. sample of the coating composition prepared in Example 28 is admixed with 0.5 gm. of p-toluene sulfonic acid. The resulting coating composition is spray applied with two costs to three aluminum panels for evalution. The films are air dried for one hour and thereafter baked for 30 minutes at 150° F. and then for 30 minutes at 250° F. All of the panels have a good white appearance both before and after baking and have a Kubelka-Munk scattering coefficient as described in Example 8. The baked films were not only white in appearance, but are tough, mar resistant coatings.

EXAMPLE 30

A coating composition is prepared by first preparing a composite by dispersing 20.0 gms. of Polymer A in 80.0 gms. of methanol. To this dispersion there is added 70.9 gms. of Copolymer H, 23.2 gms. of Aminoplast Resin B, 6.0 gms. of a solution having a 65% solids content of Epon 1001 and finally adding 170.0 gms. of Cellosolve acetate. The composition is agitated until all of the aforementioned materials are dissolved and thoroughly mixed. To this composite there is slowly added with stirring 120.0 gms. of hi-flash aromatic naphtha and 1.2 gms. of concentrated phosphoric acid as catalyst. The entire mixture is agitated until a homogeneous solution is produced. The solution is then drawn down on an aluminum panel using a 0.003" Bird Applicator. The coating is air dried for one hour at which time the film is tack-free according to the Cotton Fiber Method and the film is baked to rapidly cure the coating at 350° F. for 20 minutes. The cured film is an abrasive resistant white coating having a Kubelka-Munk scattering coefficient as described in Example 8.

EXAMPLE 31

As a comparison, a coating composition having the same polymers as described in Example 30 is prepared but does not contain the void forming non-solvent. The following coating composition has in place of the non-solvent a strong solvent and a pigment paste containing $TiO_2$. The composition is prepared as follows: A composite is first prepared by dispersing 20.0 gms. of Polymer A in 80.0 gms. of methanol. To this dispersion there is added 39.6 gms. of Copolymer H, 32.2 gms. of Aminoplast Resin B, 6.0 gms. of Epon 1001 (as described in Example 30), and finally adding 158.0 gms. of Cellosolve acetate. The composite is agitated until all of the aforementioned materials are dissolved and thoroughly mixed. This composite is slowly added to a pigment paste containing 50.0 gms. of $TiO_2$, 31.3 gms. of Copolymer H and 2.08 gms. of Cellosolve acetate (prepared by grinding the mixture until a smooth dispersion is obtained). This mixture is thoroughly mixed by agitation and 120.0 gms. of methyl ethyl ketone are slowly added along with 1.2 gms. of concentrated phosphoric acid. After further agitation the solution is drawn down as a film on an aluminum panel for curing and evaluation according to the technique described in Example 30. The resulting films are tough, mar resistant white coating.

EXAMPLE 32

The same procedure is followed as described in Example 31, except that in place of $TiO_2$ in the pigment paste there is added 50.0 gms. of antimony oxide ($Sb_2O_3$). The resulting film is a dull white coating which is tough and mar resistant.

The aluminum panels coated with the compositions of Examples 30–32 are evaluated for their luminous reflectance with a recording spectrophotometer equipped with a digital tristimulus integrator. All measurements are made relative to pressed $BaSO_4$ white standard, which has an average absolute reflectance equal to about 97.5%. The compositions are applied at a controlled dry film thickness of about 0.3 to 0.4 mil.

TABLE B

| | Luminous reflectance | |
|---|---|---|
| Film tested | Before baking, percent | After baking, percent |
| Example 30 (voids only) | 58.2 | 58.4 |
| Example 31 (no voids, with $TiO_2$) | 54.1 | 56.2 |
| Example 32 (no voids, with $Sb_2O_3$) | 32.8 | 33.2 |

The foregoing comparative examples as illustrated in the table clearly demonstrate the superior results obtained by the compositions of this invention. It can be seen that the films which contain voids as contemplated by the practice of this invention have a greater luminous reflectance alone than a similar film without voids containing either $TiO_2$ or $Sb_2O_3$.

EXAMPLE 33

A coating composition is prepared by dissolving the following materials by stirring: 80 gms. of Copolymer I, 60 gms. of Aminoplast Resin A, 120 gms. of methyl isobutyl ketone, 30 gms. of Polymer E, 2 gms. of a 75% solution of butyl hydrogen phosphate, 2.0 gms. of an organo-silicone block copolymer being a soft wax having a melting point of 32° C.–35° C., a viscosity of 200–400 centistokes, a cloud point (1 percent water solution) of 64° C., and a specific gravity of 1.07 (35°/25° C.) as a surfactant and 30 gms. of acetone. To compare the effect of adding varying amounts of the non-solvent, odorless mineral spirits (boiling point range of 349 to 406° F., refractive index 1.4217 at 20° C., specific gravity of 0.754 (60/60° F.) and a Kauri-Butanol value of 25.3, six (6) 32 gm. aliquot samples are taken and a prescribed amount of non-solvent is added to each sample. The films formed from each sample are air dried for one hour and then baked for 20 minutes at 275° F. The following table indicates the results of this comparison:

TABLE C

| | Amount of non-solvent, gms. | Appearance of film |
|---|---|---|
| 33A | 3 | Clear, high gloss film. |
| 33B | 5 | Hazy, high gloss film. |
| 33C | 8 | Do. |
| 33D | 10 | Hazy opaque, high gloss film. |
| 33E | 13 | Opaque, high gloss film. |
| 33F | 18 | Do. |

It will be understood by those of skill in the art that various modifications of the present invention as described in the foregoing examples may be employed without departing from the scope of the invention. For example, it is possible to use the various resin systems described above in the description of the invention in the same manner as exemplified in the examples.

I claim:

1. A thermosetting coating composition which comprises a solution of at least one film forming, gelable thermosetting polymer capable of forming a single phase solution in a mixture of at least two miscible liquids,
   wherein at least one of the liquids in said mixture is a non-solvent for said thermosetting polymer and has a lower volatility than that of the other liquids in said mixture,
   wherein the amount of said non-solvent liquid of low volatility present in said mixture is sufficient to provide a continuous, opaque film containing primarily discrete closed cells, upon the removal of said liquid mixture from said film,
   wherein said film has a Kubelka-Munk scattering coefficient greater than 0.5 reciprocal mils at 4400 angstroms and greater than 0.1 reciprocal mils at 5600 angstroms, and less than which, upon the removal of said liquid mixture from said composition, produces a discontinuous film.

2. A thermosetting coating composition of claim 1 wherein said thermosetting polymer is selected from the group consisting of admixtures of interpolymers of hydroxyl esters of ethylenically unsaturated acids with at least one other polymerizable ethylenically unsaturated monomer; admixtures of alkyd resins; aldehyde modified interpolymers of ethylenically unsaturated carboxylic amides with at least one other polymerizable ethylenically unsaturated monomer; polyepoxy resins; aminoplast resins; and mixtures of two or more of these.

3. A thermosetting polymer composiiton which comprises a solution of at least one film forming, gelable thermosetting polymer capable of forming a single phase solution in a mixture of at least two miscible liquids, wherein at least one of the liquids in said mixture is a non-solvent for said thermosetting polymer and has a lower volatility than that of the other liquids in said mixture,
   wherein the weight ratio of the non-solvent to polymer solids in said composition is from about 1:3 to about 3:1,
   wherein said thermosetting polymer is selected from the group consisting of admixtures of interpolymers of hydroxyl esters of ethylenically unsaturated acids with at least one other polymerizable ethylenically unsaturated monomer; admixtures of alkyd resins; aldehyde modified interpolymers of ethylenically unsaturated carboxylic acid amides with at least one other polymerizable ethylenically unsaturated monomer; polyepoxy resins; and mixtures of two or more of these.

4. A composition as defined in claim 3 wherein said thermosetting polymer comprises an admixture of an interpolymer of a hydroxyl ester of an ethylenically unsaturated acid with at least one other polymerizable ethylenically unsaturated monomer.

5. A composition as defined in claim 4, wherein said interpolymer admixture contains a cross linking agent.

6. A composition as defined in claim 3 wherein said thermosetting polymer comprises a mixture of (1) an alkyd resin and (2) an aminoplast resin.

7. A composition as defined in claim 6 wherein said alkyd resin is a non-oxidizable, oil modified alkyd resin.

8. A composition as defined in claim 3 wherein said thermosetting polymer comprises an aldehyde-modified interpolymer of an ethylenically unsaturated carboxylic acid amide with at least one other polymerizable ethylenically unsaturated monomer.

9. A composition as defined in claim 4 wherein at least 2 percent by weight of said hydroxyl ester of an ethylenically unsaturated acid is interpolymerized with said ethylenically unsaturated monomers.

10. A composition as defined in claim 9 wherein said interpolymer admixture of hydroxyl esters of an ethylenically unsaturated acid is selected from the group consisting of hydroxyalkyl acrylates and hydroxyalkyl methacrylates,
    wherein said ethylenically unsaturated monomer mixture is selected from the group consisting of methyl methacrylate, ethyl acrylate, styrene, vinyltoluene, acrylonitrile, methacrylonitrile, methacrylic acid, acrylic acid, 2-ethylhexyl acrylate, butyl acrylate, butyl methacrylate, and lauryl methacrylate.

11. A composition as defined in claim 10 wherein said interpolymer admixture contains a cross linking agent selected from the group consisting of aminoplast resins and organic diisocyanates.

12. A composition as defined in claim 11 wherein said aminoplast resin is selected from the group consisting of an alkoxylated melamine-formaldehyde and urea-formaldehyde resins.

13. A composition as defined in claim 3 wherein said thermosetting polymer is a polyepoxy resin.

14. A composition as defined in claim 13 which contains a cross linking agent therefor.

15. A composition as defined in claim 14 wherein said polyepoxy resin is the reaction product of 2,2-bis(4-hydroxyphenyl)propane and epichlorohydrin and said cross linking agent is an aminoplast resin.

16. A composition as defined in claim 8 wherein the ethylenically unsaturated carboxylic acid amide is selected from the group consisting of acrylamide and methacrylamide.

17. A composition as defined in claim 16 wherein the polymerizable ethylenically unsaturated monomer is selected from the group consisting of styrene, isobutylene, 1,3-butadiene, 2-chlorobutene, vinyl chloride, vinylidene chloride, alphamethylstyrene, alpha-chlorostyrene, 2-chlorostyrene, 2-chloro-1, 3-butadiene, 1,1-dichloroethylene, vinyl butyrate, vinyl acetate, allyl chloride, methyl methacrylate, methyl acrylate, ethyl methacrylate, ethyl acrylate, butyl methacrylate, butyl acrylate, lauryl methacrylate, acrylonitrile, methacrylonitrile, acrylic acid, methacrylic acid and vinyl silicone containing compounds.

18. A composition as defined in claim 17 wherein interpolymer contains an aminoplast resin and a curing agent.

19. A composition as defined in claim 18 wherein said aminoplast is selected from the group consisting of alkoxylated melamine-formaldehyde and urea-formaldehyde resins and said curing agent is a mineral acid.

20. A method for producing continuous, opaque films containing discrete closed cells comprising:
  (a) forming into a film a composition comprising a film forming material containing at least one thermosetting film forming, gelable polymer, and
    a solvent mixture for said film forming material comprising at least two miscible non-aqueous liquids, at least one of said liquids being a non-solvent for said polymer and having a lower volatility than that of the other liquids in said mixture, said solvent mixture and said polymer forming a single phase,
    wherein the weight ratio of the non-solvent to the polymer solids is from about 1:3 to about 3:1 in parts by weight,
  (b) removing said solvent mixture from the film,
  (c) curing said film forming thermosetting polymer to produce a tough, mar-resistant film.

21. A method for producing continuous, opaque films containing discrete closed cells comprising:
  (a) forming into a film a composition comprising a film forming material containing at least one thermosetting film forming, gelable polymer, and
    a solvent mixture for said film forming material comprising at least two miscible non-aqueous liquids, at least one of said liquids being a non-solvent for said polymer and having a lower volatility than that of the other liquids in said mixture, said solvent mixture and said polymer forming a single phase,
    the amount of said lower volatility non-solvent liquid present in said mixture being at least enough to produce, upon the removal of said solvent mixture from said composition, a film having in the absence of an opacifying pigment a Kubelka-Munk scattering coefficient greater than 0.5 reciprocal mils at 4400 angstroms and greater than 0.1 reciprocal mils at 5600 angstroms, and less than that which, upon removal of said solvent mixture from said composition, produces a discontinuous film, and
  (b) removing said solvent mixture from the film,
  (c) curing said film forming polymer to produce a tough, mar-resistant film.

22. A method as defined in claim 21 wherein said film forming, gelable polymer is prepared in said solvent mixture by polymerizing therein the corresponding monomers.

23. A method as defined in claim 21 wherein said composition contains a plurality of polymers.

24. A method as defined in claim 20 wherein said solvent mixture is removed by air drying.

25. A method as defined in claim 20 wherein said solvent mixture is removed by the use of a vacuum.

26. A substrate coated with a film as defined in claim 20.

27. A tough, abrasion resistant film comprising a continuous sheet containing a plurality of discrete closed cells, said cells having an average size below 1.0 micron and said film having in the absence of an opacifying pigment a Kubelka-Munk scattering coefficient greater than 0.5 reciprocal mils at 4400 angstroms and greater than 0.1 reciprocal mils at 5600 angstroms, said sheet comprising a rigid, crosslinked, thermoset polymer.

28. An article coated with the film of claim 20.

29. An article coated with the film of claim 27.

References Cited
UNITED STATES PATENTS

| | | | |
|---|---|---|---|
| 3,450,650 | 6/1969 | Murata | 260—2.5 M |
| 3,486,946 | 12/1969 | Duddy | 260—2.5 M |
| 3,085,073 | 4/1963 | Lintner et al. | 260—2.5 B |
| 3,544,489 | 12/1970 | Dowbenko et al. | 260—2.5 M |
| 3,475,355 | 10/1969 | Decker | 260—2.5 M |
| 3,031,328 | 4/1962 | Larsen | 117—36.1 |
| 3,446,769 | 5/1969 | Opipari | 260—31.4 |

MURRAY TILLMAN, Primary Examiner

M. FOELAK, Assistant Examiner

U.S. Cl. X.R.

106—122, 130, 288, 302, 309; 117— 36.1, 36.7, 37 R, 39, 64 R, 155 R, 155 L, 155 UA, 159, 161 K, 161 L, 161 LN, 161 UZ, 161 H, 161 ZB; 210—510; 260—2.5 R, 1, 18 EP, 37 R, 37 EP, 37 N, 39 R, 40 R, 41 R, 830 S, 830 P, 834, 850, 851, 856, 21, 31.2 R, 31.2 N, 31.4 R, 31.4 EP, 32.8 R, 32.8 EP, 32.8 N, 33.2 EP, 33.2 R, 33.4 EP, 33.4 R, 33.6 EP, 33.6 VA, 33.8 EP, 33.8 R, 33.8 UA; 264—4, 41, 53, 344